(12) United States Patent
Takagi et al.

(10) Patent No.: US 9,879,733 B2
(45) Date of Patent: Jan. 30, 2018

(54) POWER TRANSMISSION DEVICE AND IMAGE FORMING APPARATUS INCLUDING SAME

(71) Applicants: Hiroaki Takagi, Kanagawa (JP); Naoyuki Suido, Kanagawa (JP); Keisuke Shimizu, Tokyo (JP); Kimiharu Yamazaki, Kanagawa (JP)

(72) Inventors: Hiroaki Takagi, Kanagawa (JP); Naoyuki Suido, Kanagawa (JP); Keisuke Shimizu, Tokyo (JP); Kimiharu Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/629,929

(22) Filed: Feb. 24, 2015

(65) Prior Publication Data

US 2015/0240879 A1    Aug. 27, 2015

(30) Foreign Application Priority Data

Feb. 25, 2014    (JP) .................................. 2014-033565
Dec. 25, 2014    (JP) .................................. 2014-261964

(51) Int. Cl.
*F16D 3/72*    (2006.01)
*F16D 3/18*    (2006.01)
*G03G 21/16*    (2006.01)
*F16H 55/08*    (2006.01)
*F16H 55/17*    (2006.01)
*G03G 15/00*    (2006.01)
*F16D 11/00*    (2006.01)

(52) U.S. Cl.
CPC .............. *F16D 3/72* (2013.01); *F16D 3/185* (2013.01); *F16H 55/0886* (2013.01);
(Continued)

(58) Field of Classification Search
CPC ...... F16D 3/72; F16D 3/185; F16D 2011/002; F16D 2011/008; F16H 55/0886;
(Continued)

(56) References Cited

U.S. PATENT DOCUMENTS 2,380,113 A * 7/1945 Kuhns ..................... F16D 3/185
464/154
2,841,966 A    7/1958 Belden et al.
(Continued)

FOREIGN PATENT DOCUMENTS

EP    1117012 A2    7/2001
JP    2005-241946    9/2005
(Continued)

OTHER PUBLICATIONS

Search Report for corresponding European Application No. 15156577.7 dated Jul. 24, 2015.

*Primary Examiner* — Gregory J Binda
(74) *Attorney, Agent, or Firm* — Harness, Dickey & Pierce, P.L.C.

(57) ABSTRACT

A power transmission device includes coaxially a first rotary body including a first gear on a drive source side, a second rotary body including a second gear on a driven side, a third rotary body including a third gear movably held to transmit a driving force, and a guide member disposed at one of the first gear, the second gear, and the third gear to contact a first end surface of a gear tooth of another of the first gear, the second gear, and the third gear, serving as a mating gear, to guide the first end surface between teeth of the one of the first gear, the second gear, and the third gear. The guide member extends toward the mating gear and a tip of the guide member is placed at a distance from an end of the one of the gears in the axial direction.

17 Claims, 14 Drawing Sheets

(52) U.S. Cl.
CPC ............ *F16H 55/17* (2013.01); *G03G 15/757* (2013.01); *G03G 21/1647* (2013.01); *F16D 2011/002* (2013.01); *F16D 2011/008* (2013.01); *F16H 2055/176* (2013.01); *G03G 2221/1657* (2013.01); *Y10T 403/7032* (2015.01)

(58) Field of Classification Search
CPC . F16H 55/14; F16H 2055/176; G03G 15/757; G03G 21/1647; G03G 2221/1657; Y10T 403/7032
USPC ......... 464/154, 156, 158, 159, 901; 399/167
See application file for complete search history.

(56) References Cited

U.S. PATENT DOCUMENTS

| | | | | |
|---|---|---|---|---|
| 3,243,973 | A | | 4/1966 | Kraeling |
| 3,249,377 | A | * | 5/1966 | Weasler ................ F16D 1/10 464/158 X |
| 3,517,953 | A | * | 6/1970 | Wright et al. ...... B25B 23/0035 |
| 6,193,232 | B1 | | 2/2001 | Regimbal et al. |
| 6,482,094 | B2 | * | 11/2002 | Kefes ...................... F16D 1/06 464/901 |
| 6,968,144 | B2 | * | 11/2005 | Mizoguchi ............... F16D 1/10 399/167 |
| 7,588,385 | B2 | * | 9/2009 | Sugata ................... F16D 11/14 399/167 |
| 8,064,801 | B2 | * | 11/2011 | Sugiyama .......... G03G 21/1864 399/167 |
| 2001/0008590 | A1 | | 7/2001 | Katada et al. |
| 2009/0196655 | A1 | | 8/2009 | Takigawa et al. |
| 2014/0356027 | A1 | | 12/2014 | Yamazaki et al. |

FOREIGN PATENT DOCUMENTS

| | | |
|---|---|---|
| JP | 2007-108349 | 4/2007 |
| JP | 2009-092146 | 4/2009 |
| JP | 2009-104101 | 5/2009 |
| JP | 2009-204002 | 9/2009 |
| JP | 2011-197298 | 10/2011 |

* cited by examiner

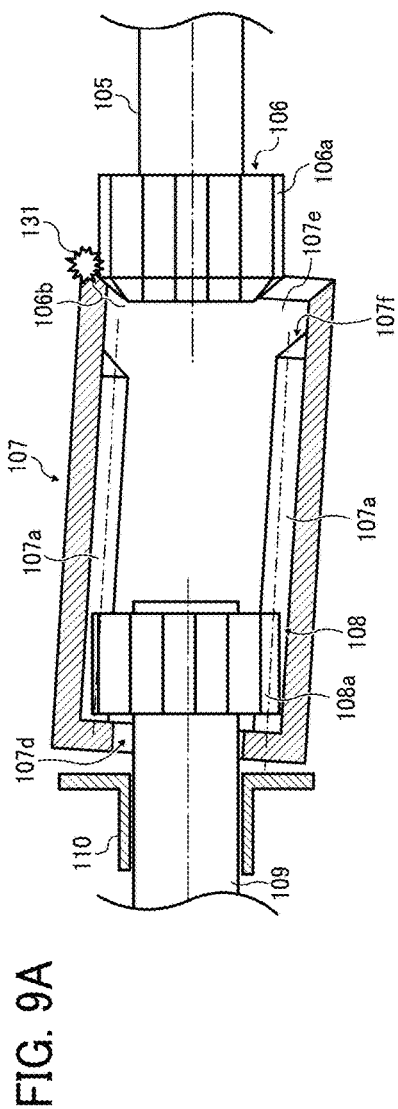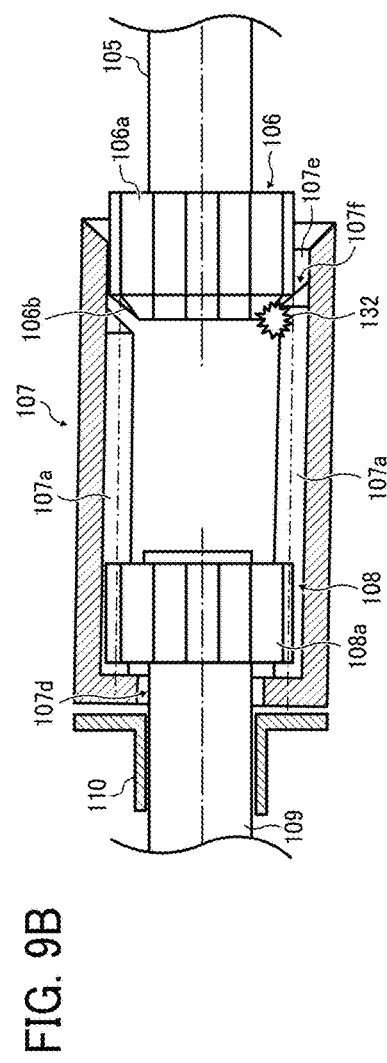
FIG. 9A
FIG. 9B

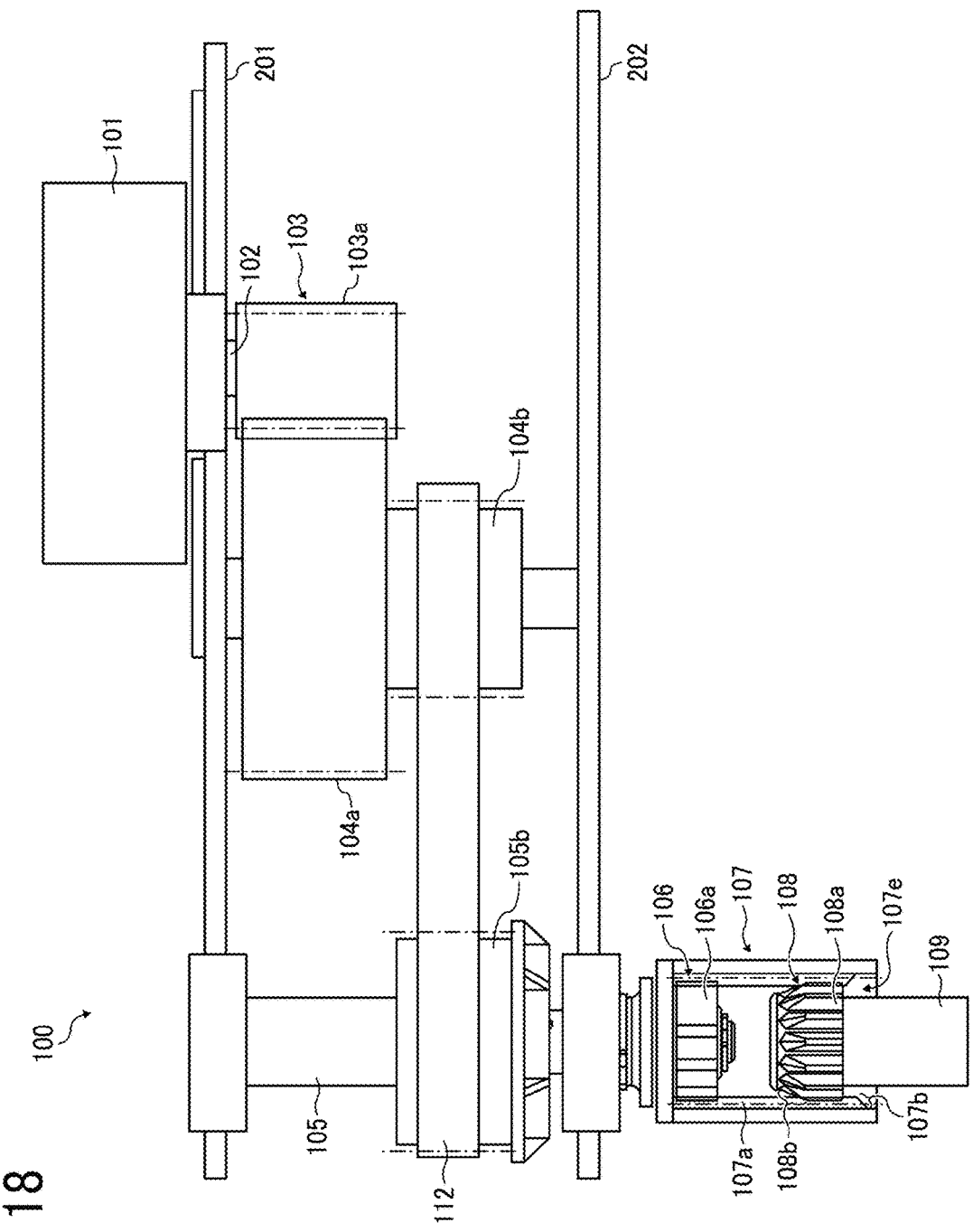

POWER TRANSMISSION DEVICE AND IMAGE FORMING APPARATUS INCLUDING SAME

CROSS-REFERENCE TO RELATED APPLICATIONS

This patent application is based on and claims priority pursuant to 35 U.S.C. § 119 from Japanese Patent Application Nos. 2014-033565, filed on Feb. 25, 2014, and 2014-261964, filed on Dec. 25, 2014, both in the Japan Patent Office, which are hereby incorporated herein by reference in their entirety.

BACKGROUND

Technical Field

Exemplary aspects of the present disclosure generally relate to a power transmission device and an image forming apparatus including the power transmission device.

Description of the Related Art

There is known a power transmission unit that transmits power from a drive source such as a motor to a rotary body such as a photoconductor and a developing roller, and is detachably attachable relative to the rotary body to allow the rotary body and the drive source to be replaced.

SUMMARY

In view of the foregoing, in an aspect of this disclosure, there is provided a novel power transmission device including a first rotary body, a second rotary body, a third rotary body, and a guide member. The first rotary body includes a first gear rotated by a driving force from a drive source and is disposed on a drive source side on a power transmission path through which the driving force is transmitted from the drive source to a driven member. The second rotary body includes a second gear disposed on a driven side on the power transmission path. The third rotary body includes a third gear disposed on the power transmission path to transmit the driving force to the second rotary body by meshing with the first gear and the second gear, and the third rotary body is movably held within a power transmittable range. The guide member is disposed at one of the first gear, the second gear, and the third gear to contact a first end surface of a gear tooth of another of the first gear, the second gear, and the third gear serving as a mating gear, to guide the first end surface of the gear tooth of the mating gear between gear teeth of the one of the first gear, the second gear, and the third gear. The guide member extends toward the mating gear in an axial direction of the one of the first gear, the second gear, and the third gear, and a tip of the guide member is spaced apart a predetermined distance from an end of the one of the first gear, the second gear, and the third gear in the axial direction.

According to another aspect, an image forming apparatus includes a plurality of rotary bodies and the power transmission device to transmit the driving force from the drive source to the plurality of rotary bodies.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein:

FIG. 9A is a cross-sectional view schematically illustrating the drive-source side joint gear being inserted to the intermediate gear which is tilted in Embodiment 3;

FIG. 9B is a cross-sectional view schematically illustrating the internal teeth of the intermediate gear and the external teeth of the drive-source side joint gear colliding with each other;

FIG. 18 is a cross-sectional view schematically illustrating the driven side rotary body detachably attachable relative to the power-transmission rotary body according to Embodiment 6.

DETAILED DESCRIPTION

Figure 1:
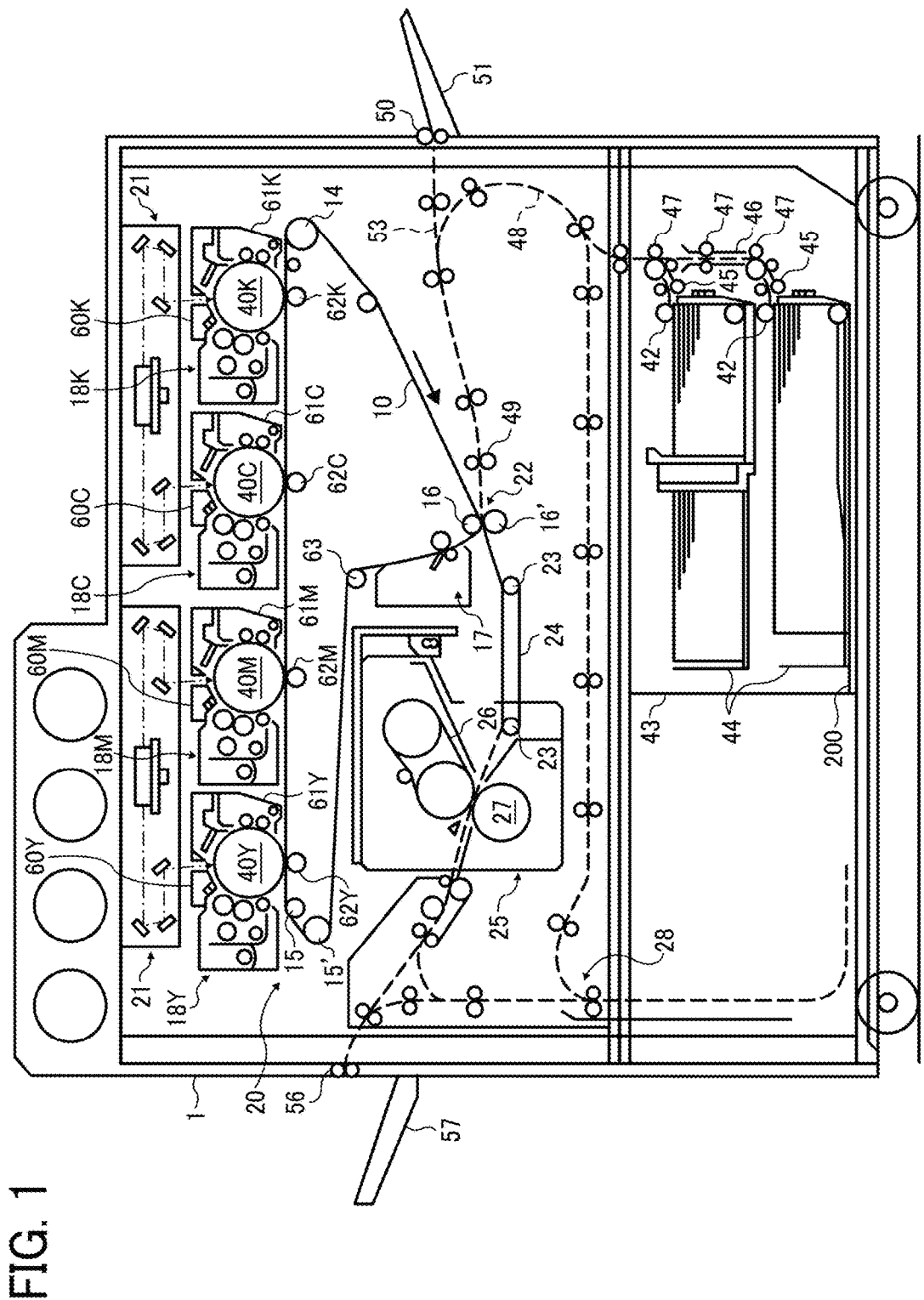
FIG. 1 is a schematic diagram illustrating an image forming apparatus according to an illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

In order to facilitate an understanding of the novel features of the present invention, as a comparison a description is provided of a known power transmission device. In the known power transmission device, for example, a flange including a cylindrical-shaped input portion is fixed to an end portion of a rotary shaft of a driven side rotary body disposed at a drive source side. Internal teeth are formed on an inner circumferential surface of a cylindrical-shaped input portion.

A planetary gear is disposed on a drive source side. A carrier of a last stage of the planetary gear includes a cylindrical-shaped output portion with internal teeth formed on an inner circumferential surface thereof, thereby constituting an output internal gear. A power-transmission rotary body includes a power-transmission external gear having drive-source side external teeth meshing with the output internal gear and driven side external teeth meshing with the input gear. The drive-source side external teeth and the driven side external teeth are formed such that the center of tooth profile of the drive-source side external teeth and that of the driven side external teeth are on the same straight line.

The carrier of the last stage is floatingly supported by a supporting member with a clearance relative to an end portion of a rotary shaft of a sun gear of the planetary gear. The carrier is movable within a range in which the driving force of the drive source side can be transmitted to the drive target. The driven side rotary body is detachably mountable in an axial direction of the power-transmission rotary body.

In this configuration, despite errors such as axis eccentricity and axis declination between the rotary shaft of the drive source side and the rotary shaft of the driven side rotary body, and eccentricity and distortion of the output internal gear of the carrier of the last stage and the driven side rotary body, these errors are compensated by the movement of the carrier of the last stage of the output internal gear meshing with the external gear of the power-transmission rotary body disposed between the rotary shafts, thereby transmitting properly the driving force of the drive-source side rotary body to the driven side rotary body.

However, the driven side rotary body in a separated state is difficult to engage smoothly the power-transmission rotary body fitted to the carrier of the last stage. Such difficulty occurs easily when the power-transmission rotary body fitted to the carrier of the last stage supported floatingly by the supporting member is tilted by self weight in such a manner that the end portion of the driven side rotary body drops. In this state, the axis line of the power-transmission rotary body and the axis line of the driven side rotary body are not aligned, causing end surfaces of teeth to interfere with each other easily. In some cases, such interference hinders the power-transmission rotary body from engaging properly while rotating in one direction and displacing towards a horizontal attitude.

The similar or the same difficulty occurs not only when the movement of the carrier of the last stage fitted to the power-transmission rotary body causes the power-transmission rotary body to move, but also when the power-transmission rotary body itself moves. Furthermore, the similar or the same difficulty occurs not only upon attachment and detachment of the driven side rotary body relative to the power-transmission rotary body, but also upon attachment and detachment of the drive-source rotary body relative to the power-transmission rotary body.

In view of the above, there is unsolved need for a power transmission device capable of reliably engaging the power-transmission rotary body with at least one of the drive-source side rotary body and the driven side rotary body while preventing misalignment of shafts and axis declination.

Referring now to the drawings, wherein like reference numerals designate identical or corresponding parts throughout the several views, exemplary embodiments of the present patent application are described.

Referring to FIG. 1, there is provided a schematic diagram illustrating an image forming apparatus according to an illustrative embodiment of the present disclosure. FIG. 1 is a schematic diagram illustrating an example of an electrophotographic image forming apparatus according to an illustrative embodiment of the present disclosure.

The image forming apparatus shown in FIG. 1 is a tandem-type image forming apparatus including a main body 1 disposed on a paper feed unit (feed table) 200 which stores multiple recording media. It is to be noted that suffixes Y, M, C, and, K denote colors yellow, magenta, cyan, and black, respectively. To simplify the description, the suffixes Y, M, C, and, K indicating colors are omitted herein unless otherwise specified.

Substantially in the center of the main body 1 of the image forming apparatus, an intermediate transfer belt 10 serving as a belt-type image bearer and as an intermediate transfer member is entrained around a plurality of support rollers 14, 15, 15', 16, and 63, and is formed into an endless loop. The intermediate transfer belt 10 is movable in a clockwise direction in FIG. 1. In FIG. 1, a belt cleaning device 17 is disposed at the left side of a secondary-transfer opposing roller 16 which serves as one of the support rollers. The belt cleaning device 17 removes residual toner remaining on the intermediate transfer belt 10 after image transfer. The image forming apparatus includes a tandem image forming unit 20 in which toner image forming stations 18Y, 18M, 18C, and 18K, one for each of the colors yellow, magenta, cyan, and black, are arranged in horizontally tandem above the looped intermediate transfer belt 10 along the direction of movement of the intermediate transfer belt 10 stretched taut between the support rollers 14 and 15.

As illustrated in FIG. 1, an optical writing unit or an exposure unit 21 serving as an optical writing mechanism is disposed above the tandem image forming unit 20. The toner image forming stations 18Y, 18M, 18C, and 18K in the tandem image forming unit 20 include drum-shaped photoconductors 40Y, 40M, 40C, and 40K, one for each of the colors yellow, magenta, cyan, and black, respectively. Latent images of the colors yellow, magenta, cyan, and black are formed on the photoconductors 40Y, 40M, 40C, and 40K, respectively. Each surface of the photoconductors 40Y, 40M, 40C, and 40K is charged uniformly by charging devices 60Y, 60M, 60C, and 60K. Subsequently, based on image data, the photoconductors 40Y, 40M, 40C, and 40K are exposed by the optical writing unit (exposure unit) 21, thereby forming the latent images on the respective photoconductors 40Y, 40M, 40C, and 40K.

The latent images on the photoconductors 40Y, 40M, 40C, and 40K are developed with respective color of toner by developing devices 61Y, 61M, 61C, and 61K, thereby forming visible images, also known as toner images, on the surface of the photoconductors 40Y, 40M, 40C, and 40K. Primary transfer rollers 62Y, 62M, 62C, and 62K serving as primary transfer devices are disposed opposite the photoconductors 40Y, 40M, 40C, and 40K with the intermediate transfer belt 10 interposed therebetween, thereby forming primary transfer nips at which toner images are transferred from the photoconductors 40Y, 40M, 40C, and 40K onto the intermediate transfer belt 10. The support roller 14 in FIG. 1 is a drive roller that rotates the intermediate transfer belt 10.

When forming a single color image of black color, rollers other than the drive roller 14, i.e., the support rollers 15 and 15', are moved such that the photoconductors 40Y, 40M, and 40C for the colors yellow, magenta, and cyan are separated from the intermediate transfer belt 10.

A secondary transfer unit 22 is disposed opposite the tandem image forming unit 20 via the intermediate transfer belt 10. The secondary transfer unit 22 includes a secondary-transfer opposing roller 16 and a secondary transfer roller 16'. In FIG. 1, the secondary transfer roller 16' is pressed against the secondary-transfer opposing roller 16 to apply a transfer electric field thereto. Accordingly, a toner image on the intermediate transfer belt 10 is transferred onto a recording medium.

A fixing unit 25 is disposed next to the secondary transfer unit 22. The fixing unit 25 serving as a fixing mechanism fixes the toner image transferred on the recording medium. The fixing unit 25 includes a fixing belt 26 and a pressing roller 27. The fixing belt 26 is formed into an endless loop to transport the recording medium. The pressing roller 27 as a pressing member is pressed against the fixing belt 26. A conveyor belt 24 serving as a recording medium conveyor is entrained around support rollers 23 and rotated. The recording medium after the toner image is transferred thereto is transported to the fixing unit 25.

An example of the image forming apparatus illustrated in FIG. 1 includes a sheet reversing unit 28 substantially below the secondary transfer unit 22 and the fixing unit 25, parallel to the tandem image forming unit 20. The sheet reversing unit 28 is provided to reverse a recording medium to form images on both sides of the recording medium.

In the image forming apparatus described above, image data is sent to the main body 1 of the image forming apparatus. Upon receiving a signal to start image formation, a drive motor, not shown, drives the support roller 14 to rotate, causing other support rollers to follow its rotation. Accordingly, the intermediate transfer belt 10 is rotated. In the meantime, the toner image forming stations 18Y, 18M, 18C, and 18K form single-color toner images yellow, magenta, cyan, and black on the photoconductors 40Y, 40M, 40C, and 40K, respectively. As the intermediate transfer belt 10 travels, the single-color images are transferred from the photoconductors 40Y, 40M, 40C, and 40K onto the intermediate transfer belt 10 at the primary transfer nips or primary transfer portions opposite the primary transfer rollers 62Y, 62M, 62C, and 62K such that the toner images are superimposed one atop the other, thereby forming a composite toner image on the intermediate transfer belt 10.

In the paper feed unit 200, one of sheet feed rollers 42 is selectively rotated so as to feed a recording medium from one of paper cassettes 44 disposed in a paper bank 43, and a separation roller 45 separates one sheet from the stack of recording media in the paper cassette 44 and feeds it to a paper feed passage 46. The recording medium is transported and guided by conveyor rollers 47 to a paper feed passage 48 in the main body 1, and comes into contact with a pair of registration rollers 49. Then, the recording medium temporarily stops. Alternatively, a sheet feed roller 50 is rotated to pick up a recording medium on a side tray 51 disposed at the lateral side of the main body 1.

The recording medium is fed to a manual feed path 53 by the separation roller one by one. In this configuration, the recording medium also comes into contact with the pair of registration rollers 49 and stops temporarily. Subsequently, the pair of registration rollers 49 rotates again to send the recording medium in appropriate timing such that the recording medium is aligned with the composite toner image formed on the intermediate transfer belt 10 and sent to a secondary transfer nip at which the intermediate transfer belt 10 and the secondary transfer roller 16' of the secondary transfer unit 22 meet. Accordingly, the composite toner image is transferred onto the recording medium at the secondary transfer nip in the secondary transfer unit 22.

After the composite toner image is transferred on the recording medium, the recording medium is transported to the fixing unit 25 in which heat and pressure are applied to the recording medium bearing the unfixed toner image to fix the unfixed toner image on the recording medium. After fixing, the recording medium is output onto a paper tray 57 by a sheet output roller 56. Alternatively, the direction of delivery of the recording medium is switched by a switching claw, thereby directing the recording medium to the sheet reversing unit 28 for duplex printing. After an image is recorded on the other side (second side) of the recording medium, the recording medium is output onto the paper tray 57 by the sheet output roller 56.

The intermediate transfer belt 10 after image transfer is cleaned by the belt cleaning device 17, thereby removing residual toner remaining on the intermediate transfer belt 10 after image transfer in preparation for the subsequent image forming operation.

In the image forming apparatus described above, the photoconductor, the charging unit, the developing device, and the cleaning device are detachably mountable as a single integrated unit also known as a process unit. Accordingly, when reaching the end of their product life cycles, these devices are detached and replaced. The power transmission device for transmission of a driving force from a drive source such as a motor in the main body to a drive target, i.e., the rotary bodies such as the photoconductor and the charging device is provided with a connecting portion that detachably connects the drive source and the rotary bodies.

The drive target is subjected to attachment and detachment for a significant number of times. Thus, reliable and smooth connection is expected of the connecting portions. More specifically, the developing device is designed taking a certain space between the photoconductor and the developing roller into an account. In other words, the developing unit is sensitive to force, and thus a force should not be applied thereto. In view of the above, it is expected of the developing device that the connecting portion has a certain degree of freedom using an intermediate member so as not to affect the space.

Figure 2:
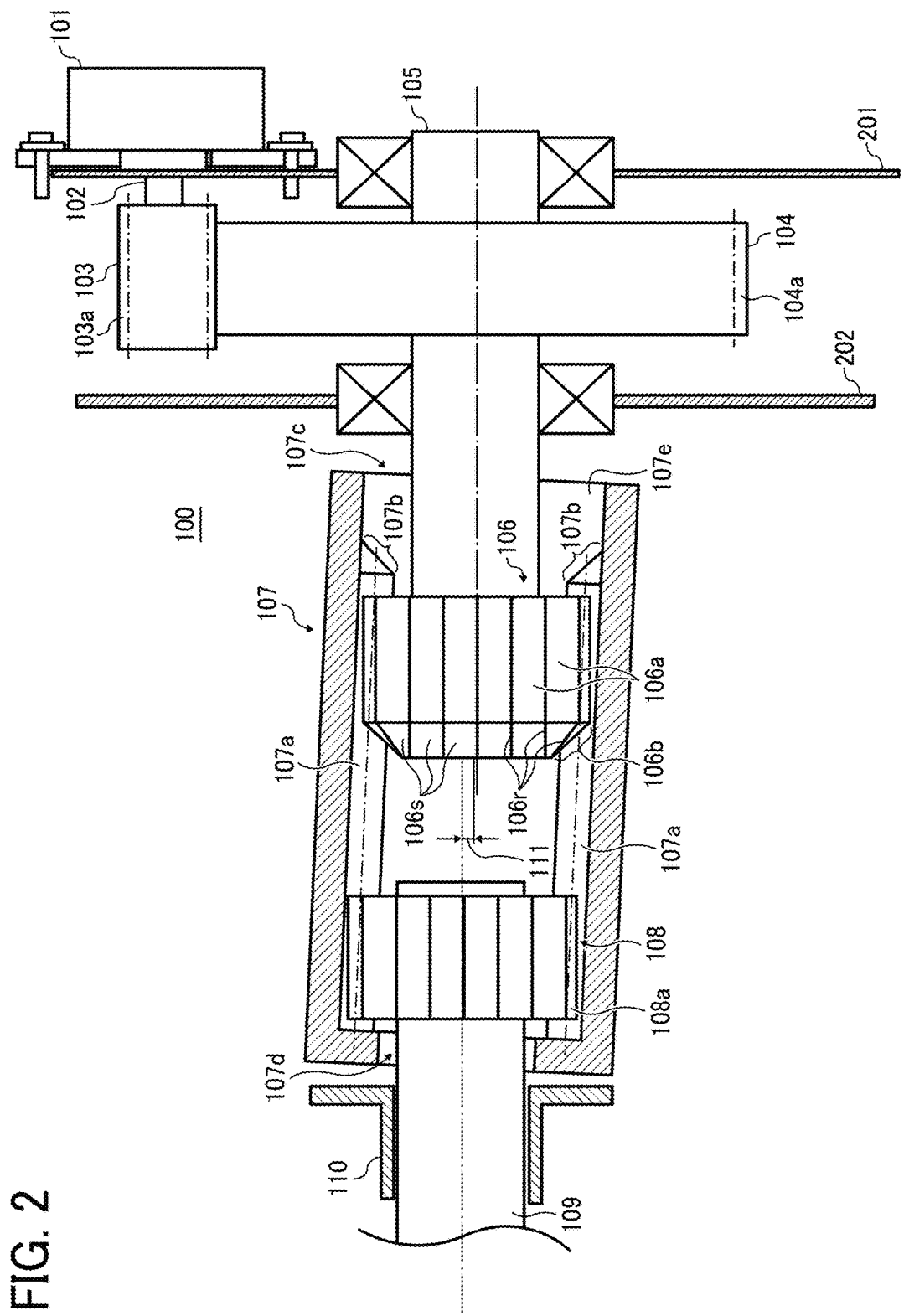
FIG. 2 is a cross-sectional view schematically illustrating a power transmission unit employed in the image forming apparatus of FIG. 1.

With reference to FIG. 2, a description is provided of a power transmission device 100 for transmission of driving force of a drive source, i.e., a motor, to the photoconductor and the developing roller of the process unit.

FIG. 2 is a cross-sectional view schematically illustrating the power transmission device 100 employed in the image forming apparatus of FIG. 1. In FIG. 2, a motor 101, which is a drive source, is fixed to a main end plate 201. A gear 103 is disposed coaxially on a drive shaft 102 of the motor 101. The gear 103 constitutes a rotary body having external teeth 103a formed on the outer circumferential surface thereof. A deceleration gear 104 meshes with the external teeth of the gear 103. More specifically, external teeth 104a, having more teeth than the external teeth of the gear 103, are formed directly on an outer peripheral surface of a rotary shaft of the deceleration gear 104 and mesh with the external teeth of the gear 103.

Figure 16:
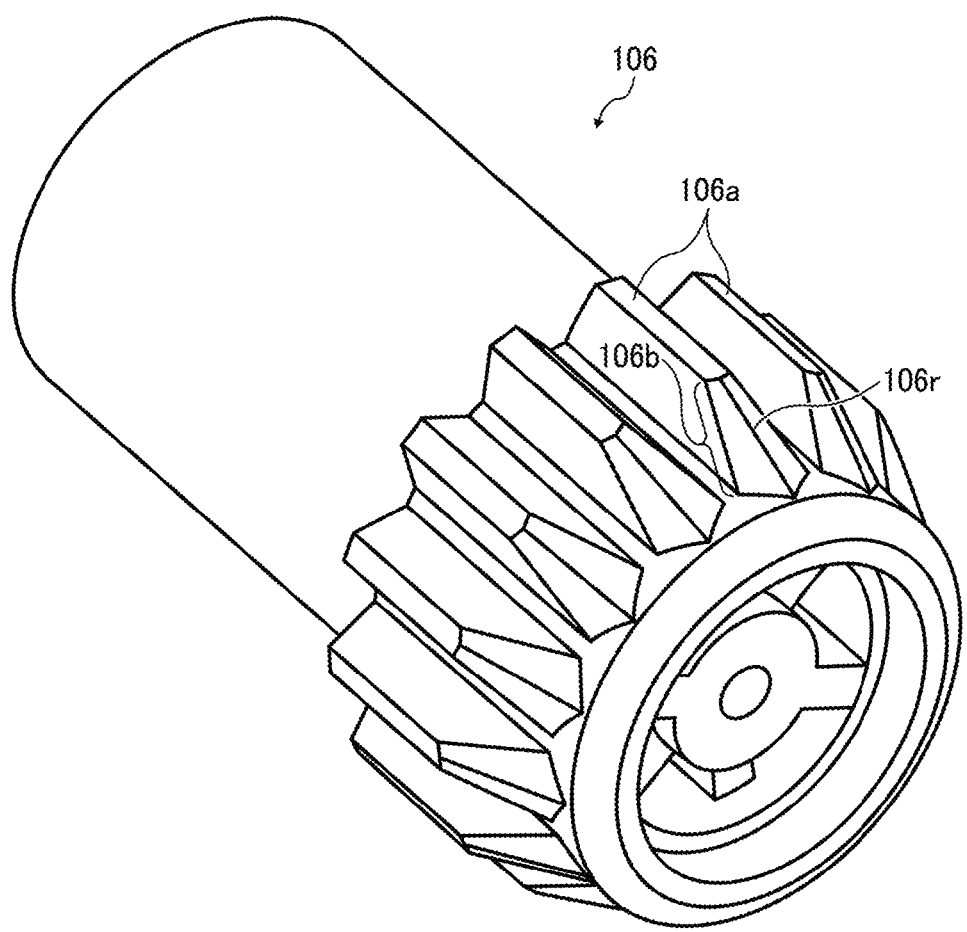
FIG. 16 is a perspective view schematically illustrating the drive-source side joint gear.

A rotary shaft 105 of the deceleration gear 104 is rotatably held by the main end plate 201 and a sub-end plate 202. The rotation speed of the motor 101 is decelerated by the deceleration gear 104. The reduction ratio is determined by a ratio of the number of external teeth of the deceleration gear 104 relative to the number of external teeth of the gear 103. A drive-source side joint gear 106 as a drive-source side rotary body is disposed at the end of the rotary shaft 105. The drive-source side joint gear 106 includes an output external gear having external teeth 106a extending in a direction parallel to an axial direction. An end surface of the external teeth 106a in the axial direction is tapered and is hereinafter referred to as a tapered portion 106b. FIG. 16 illustrates a perspective view of the drive-source side joint gear 106.

An intermediate gear 107 has a cylindrical shape and includes a connecting gear with internal teeth 107a formed on an inner circumferential surface thereof. The internal teeth 107a extend in a direction parallel to the axial direction. An end surface of the internal teeth 107a in the axial direction is tapered and is hereinafter referred to as a tapered portion 107b. The intermediate gear 107 includes a first opening 107c at the drive source side in the axial direction and a second opening 107d at the driven side which is opposite the first opening 107c. The intermediate gear 107 is floatingly supported at the second opening 107d by a driven side rotary shaft 109 with clearance. With this configuration, the intermediate gear 107 is movable within a range allowing transmission of driving force. The intermediate gear 107 includes a cylindrical portion 107e having no internal teeth 107a. The cylindrical portion 107e is formed in a certain area from the first opening 107c.

The driven side joint gear 108 includes external teeth 108a substantially at the end of the driven side rotary shaft 109 in the axial direction. The external teeth 108a extend in the direction parallel to the axial direction. The driven side rotary shaft 109 is rotatably held by a retainer 110 such as an E-ring. The outer diameter of the driven side rotary shaft 109 is smaller than the diameter of the second opening 107d. In the intermediate gear 107, the driven side rotary shaft 109 is fitted to the second opening 107d so that the driven side rotary shaft 109 is supported by the second opening 107d. With this configuration, the intermediate gear 107 has a certain degree of freedom in which the intermediate gear 107 can move in the axial direction and also on a plane perpendicular to the axial direction within a power transmittable range.

A slight gap is formed between the inner circumferential surface of the retainer 110 and the circumferential surface of the driven side rotary shaft 109 facing the inner circumferential surface of the retainer 110. Alternatively, in some embodiments, the retainer 110 is either fixed so as to move together with the driven side rotary shaft 109 or not fixed. In a case in which the material of the retainer 110 is resin, in some embodiments, the retainer 110 has a sliding property.

In the power transmission device 100 as described above, the internal teeth 107a of the intermediate gear 107 mesh with the external teeth 108a of the driven side joint gear 108 with some clearance, thereby being floatingly connected. Because the intermediate gear 107 is supported only by the driven side rotary shaft 109 with clearance between the cylindrical portion 107e of the intermediate gear 107 and the driven side rotary shaft 109, the intermediate gear 107 at the first opening 107c side tilts substantially downward by self weight, producing axis declination.

In the tilting state, the drive-source side joint gear 106 is inserted from the first opening 107c through the cylindrical portion 107e. The intermediate gear 107 is pushed upward by the drive-source side joint gear 106. Subsequently, the external teeth 106a of the drive-source side joint gear 106 mesh with the internal teeth 107a with clearance therebetween. Axis declination and misalignment of shaft center, i.e., axis deviation indicated by a reference number 111 such as shown in FIG. 2 occur. However, the misalignment of shaft center and the axis declination are compensated by the movement of the intermediate gear 107. Accordingly, the driving force of the drive source, i.e., the motor 101 is transmitted accurately to the drive target via the drive-source side joint gear 106, the intermediate gear 107, and the driven side joint gear 108.

Figure 3:
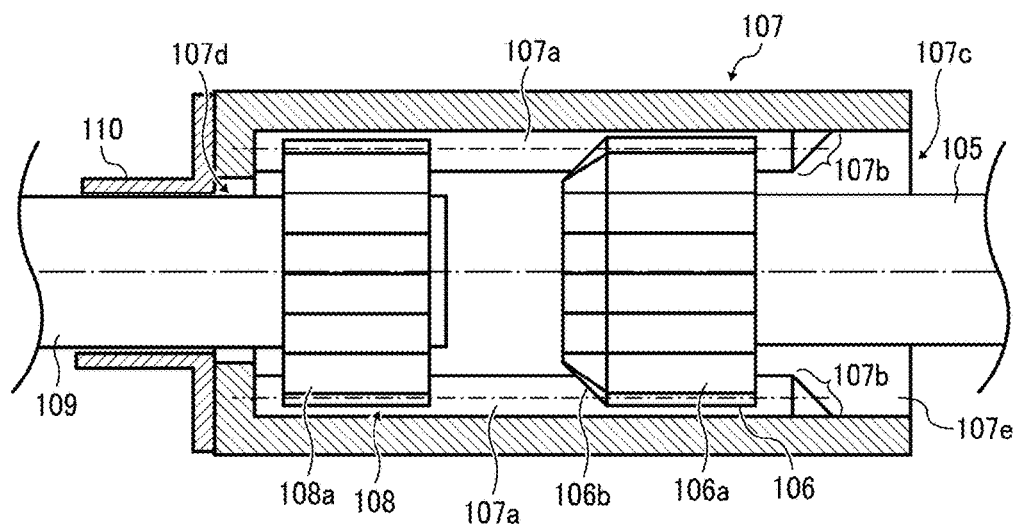
FIG. 3 is a cross-sectional view schematically illustrating a connecting portion.

With reference to FIG. 3, a description is provided of the connecting portion of the power transmission device according to the illustrative embodiment of the present disclosure. FIG. 3 is a cross-sectional view schematically illustrating the connecting portion.

As illustrated in FIG. 3, the drive-source side joint gear 106 is inserted to the intermediate gear 107 from the first opening 107c via the cylindrical portion 107e. More specifically, the external teeth 106a of the drive-source side joint gear 106 mesh with the internal teeth 107a of the intermediate gear 107 with clearance therebetween. The external teeth 106a of the drive-source side joint gear 106 and the internal teeth 107a of the intermediate gear 107 mesh with each other. Torque is applied to the rotary shaft 105 via a motor and a deceleration gear, thereby rotating the drive-source side joint gear 106 and the intermediate gear 107. Rotation of the intermediate gear 107 causes the driven side joint gear 108 to rotate.

The intermediate gear 107 is configured to accommodate the axis deviation 111 and axis declination shown in FIG. 2. Accordingly, the intermediate gear 107 can move swingably and freely. As described above, when the drive-source side joint gear 106 and the intermediate gear 107 are not engaged, the intermediate gear 107 at the first opening 107c side tilts downward by self weight with axis declination. Therefore, it is expected that the drive-source side joint gear 106 and the intermediate gear 107 are fitted together correctly.

Embodiment 1

Figure 4:
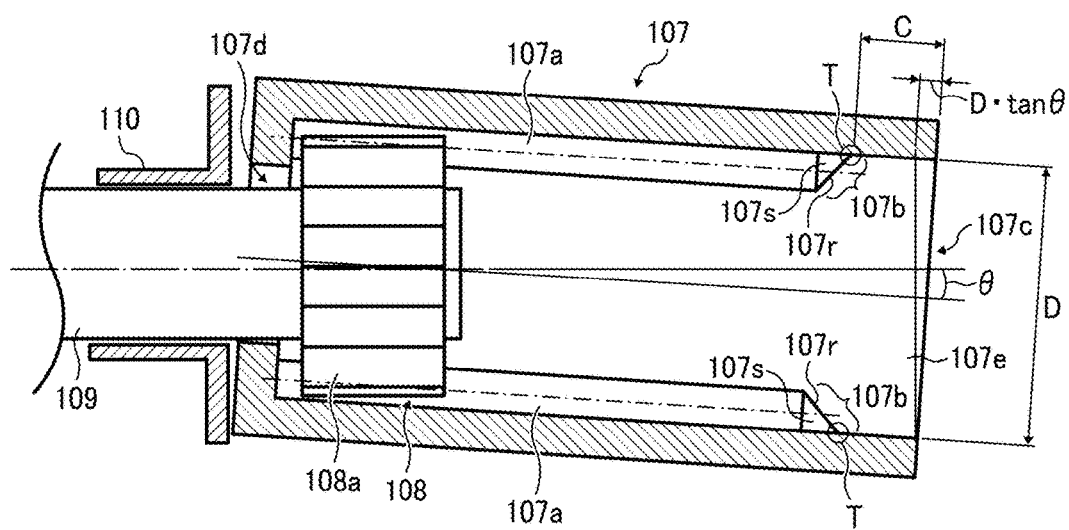
FIG. 4 is a cross-sectional view schematically illustrating a connecting portion according to Embodiment 1.

With reference to FIG. 4, a description is provided of an example of the connecting portion of the power transmission device according to an illustrative embodiment of the present disclosure.

Figure 5A:
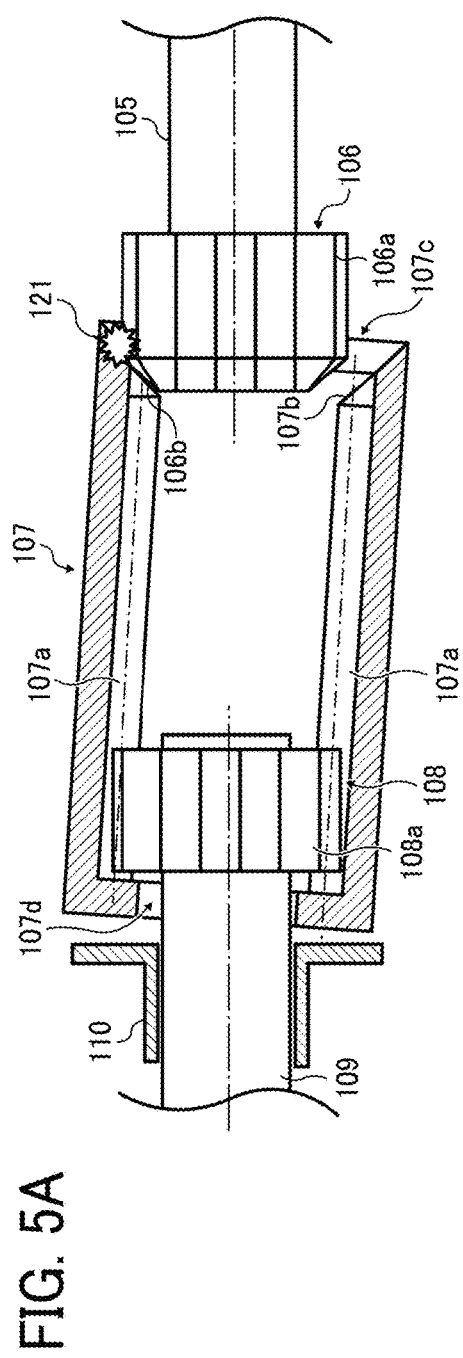
FIG. 5A is a cross-sectional view schematically illustrating a drive-source side joint gear being inserted to an intermediate gear which is tilted in Embodiment 1.

FIG. 4 is a cross-sectional view schematically illustrating the connecting portion according to Embodiment 1. As illustrated in FIG. 4, the intermediate gear 107 at the connecting portion in Embodiment 1 includes the cylindrical portion 107e formed at the first opening 107c side. In a case in which the cylindrical portion 107e is not formed such as shown in FIG. 5A, the drive-source side joint gear 106 is inserted from the first opening 107c of the intermediate gear 107 while the intermediate gear 107 is tilted by self weight. When inserted, the tapered portion 106b of the external teeth 106a of the drive-source side joint gear 106 collides with the end portion of the first opening 107c of the intermediate gear 107 obliquely from the bottom direction. The place of collision is given a reference numeral 121 and hereinafter referred to as a collision portion 121. As a result, a lifting force and a rotary force in one direction act on an end surface of a housing of the intermediate gear 107 at the collision portion 121.

Figure 5B:
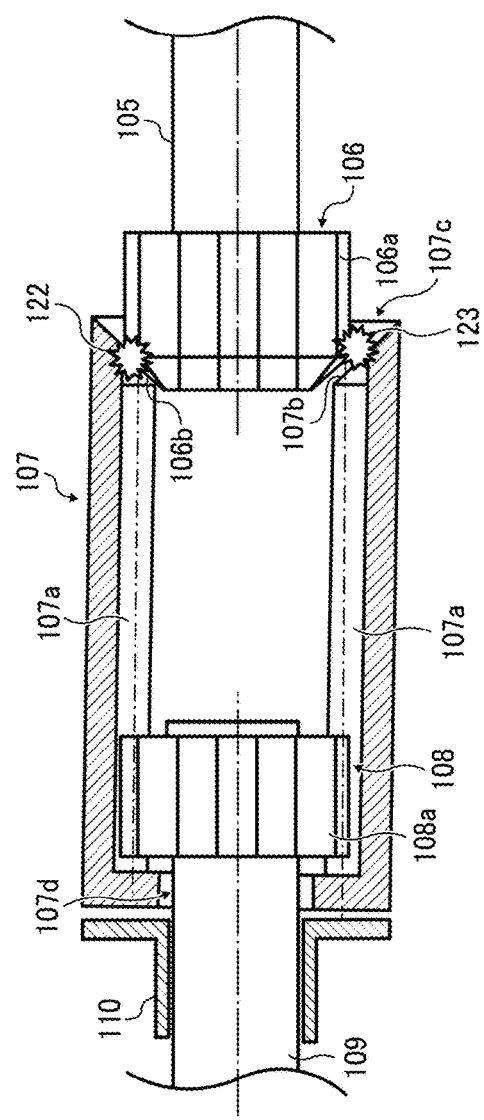
FIG. 5B is a cross-sectional view schematically illustrating internal teeth of the intermediate gear and external teeth of the drive-source side joint gear colliding with each other.

Furthermore, as illustrated in FIG. 5B, the drive-source side joint gear 106 advances inside the intermediate gear 107, and the tapered portion 107b of the internal teeth 107a of the intermediate gear 107 collides with the external teeth 106a of the drive-source side joint gear 106 at two places (i.e., collision portions 122 and 123). The collision portions are not limited to two paces. Collisions may occur at more than three places due to manufacturing errors of teeth of the gears and axis deviation.

In a case in which a slanted surface 106s of the tapered portion 106b of the drive-source side joint gear 106 contacts a slanted surface 107s on the opposite side via a ridge line 107r of the tapered portion 107b of the internal teeth 107a of the intermediate gear 107, the lifting force and the rotary force in one direction act on a tip T of the ridge line 107r at the collision portion 122. Subsequently, the lifting force and the rotary force in the opposite direction act on the end surface of the teeth of the intermediate gear 107 in the axial direction at the collision portion 122. As a result, rotary forces in the opposite direction from each other act on the intermediate gear 107, and hence the intermediate gear 107 cannot rotate. The tapered portion 107b of the intermediate gear 107 cannot advance to the root between the teeth of the drive-source side joint gear 106 so that the internal teeth 107a of the intermediate gear 107 and the external teeth 106a of the drive-source side joint gear 106 cannot mesh with each other. The intermediate gear 107 and the drive-source side joint gear 106 do not engage properly.

In FIG. 2, the reference number 106r refers to a ridge line at which the slanted surfaces 106s of the tapered portion 106b meet.

Furthermore, the internal teeth 107a of the intermediate gear 107 may run onto the external teeth 106a of the drive-source side joint gear 106, which also causes improper meshing of the gears at a constant rate. If such difficulty occurs frequently, the teeth get deformed or damaged.

In view of the above, as illustrated in FIG. 4, the intermediate gear 107 includes the cylindrical portion 107e, thereby enabling the internal teeth 107a of the intermediate gear 107 and the external teeth 106a of the drive-source side joint gear 106 to mesh while the intermediate gear 107 is substantially horizontal.

More specifically, the cylindrical portion 107e is disposed to satisfy the following relation: $C > D \cdot \tan \theta$, where $C$ is a length of the cylindrical portion 107e in the axial direction, $D$ is an internal diameter of the intermediate gear 107, and $\theta$ is an amount of inclination of the intermediate gear 107 in the axial direction. With this configuration, the intermediate gear 107 is raised while rotating. When the intermediate gear 107 becomes horizontal, the internal teeth 107a of the intermediate gear 107 and the external teeth 106a of the drive-source side joint gear 106 mesh with each other. Accordingly, the internal teeth 107a of the intermediate gear 107 are prevented from running onto the external teeth 106a of the drive-source side joint gear 106, hence preventing improper meshing, deformation, and damage of the gear teeth.

In a case in which the drive-source side joint gear 106 and the driven side joint gear 108 have a cylindrical shape, the cylindrical portion 107e may be disposed on the drive-source side joint gear 106 and the driven side joint gear 108. The above-described conditions of the cylindrical portion 107e can be applied.

Embodiment 2

Figure 6:
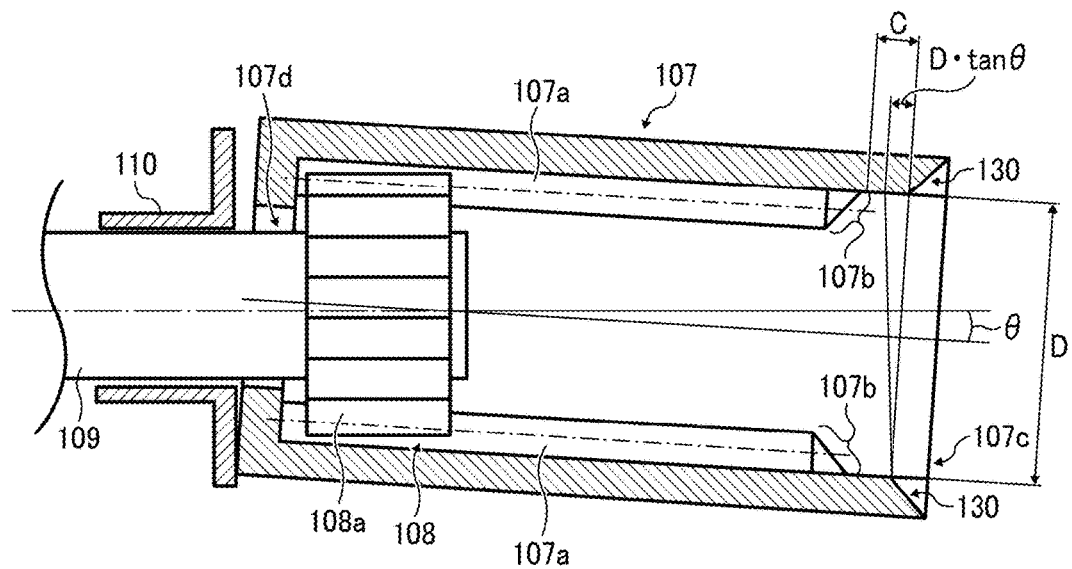
FIG. 6 is a cross-sectional view schematically illustrating a connecting portion according to Embodiment 2.

With reference to FIG. 6, a description is provided of another example of the connecting portion of the power transmission device according to Embodiment 2 of the present disclosure.

FIG. 6 is a cross-sectional view schematically illustrating a connecting portion according to Embodiment 2. The connecting portion of the present illustrative embodiment includes a tapered portion 130 at the end of the first opening 107c of the intermediate gear 107 at the drive source side. The tapered portion 130 is tapered from the end of outer circumference of the intermediate gear 107 toward the inside. With this configuration, the tapered portion 130 guides smoothly the tapered portion of the drive-source side joint gear 106 into the intermediate gear 107. Even when the intermediate gear 107 is tilted, the internal teeth 107a of the intermediate gear 107 can mesh properly with the external teeth 106a of the drive-source side joint gear 106. It is to be noted that, preferably, the cylindrical portion 107e is disposed in Embodiment 2.

Embodiment 3

With reference to FIGS. 7 through 9B, a description is provided of another example of the connecting portion of the power transmission device according to Embodiment 3 of the present disclosure.

Figure 7:
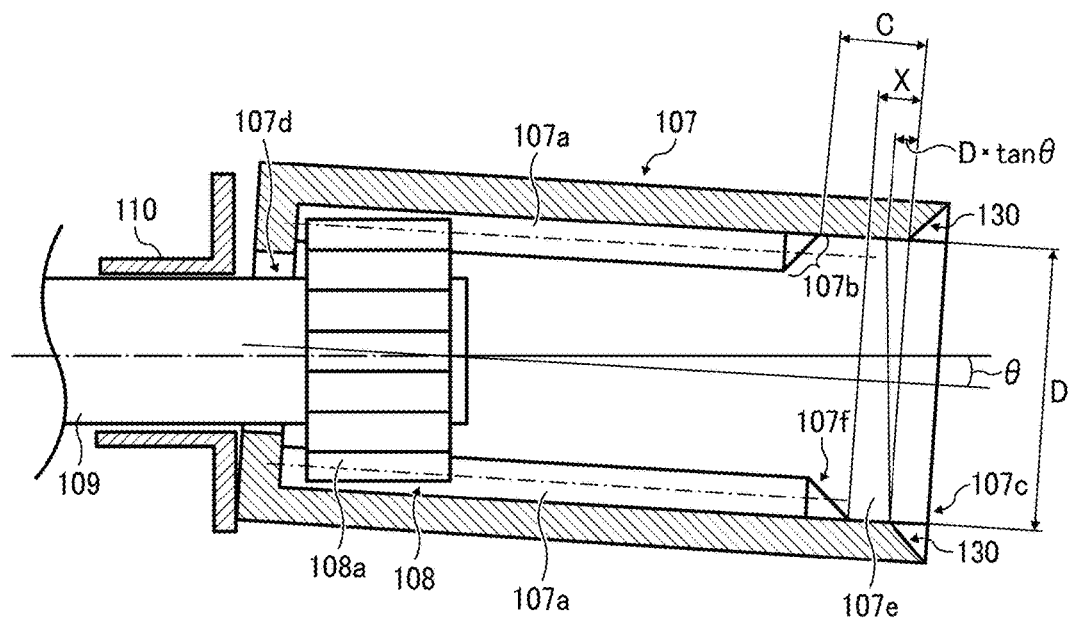
FIG. 7 is a cross-sectional view schematically illustrating the connecting portion according to Embodiment 3.
Figure 8A:
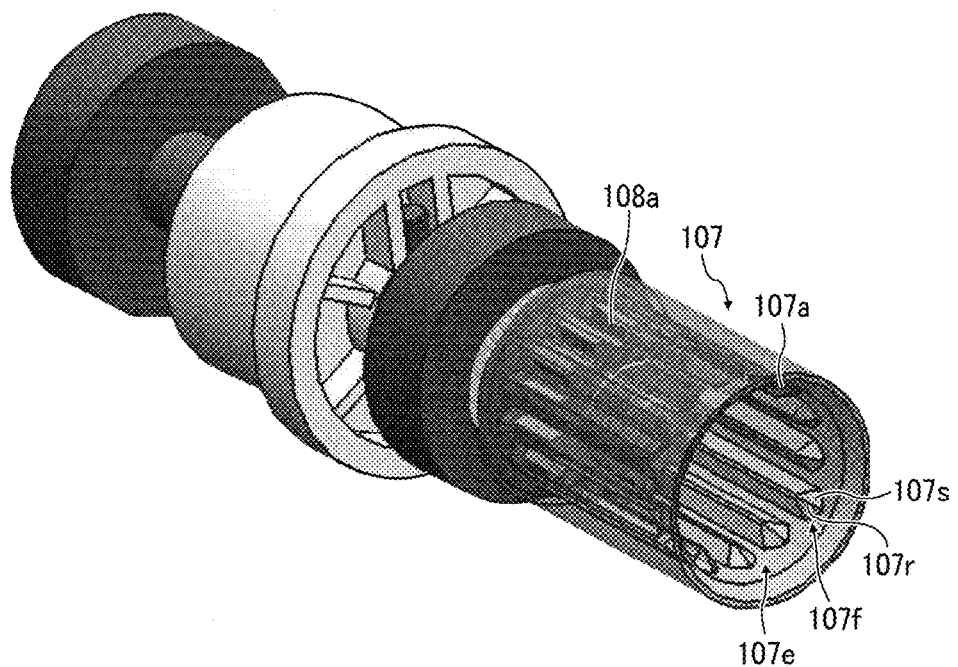
FIG. 8A is a partially transparent perspective view schematically illustrating the connecting portion of Embodiment 3.
Figure 8B:
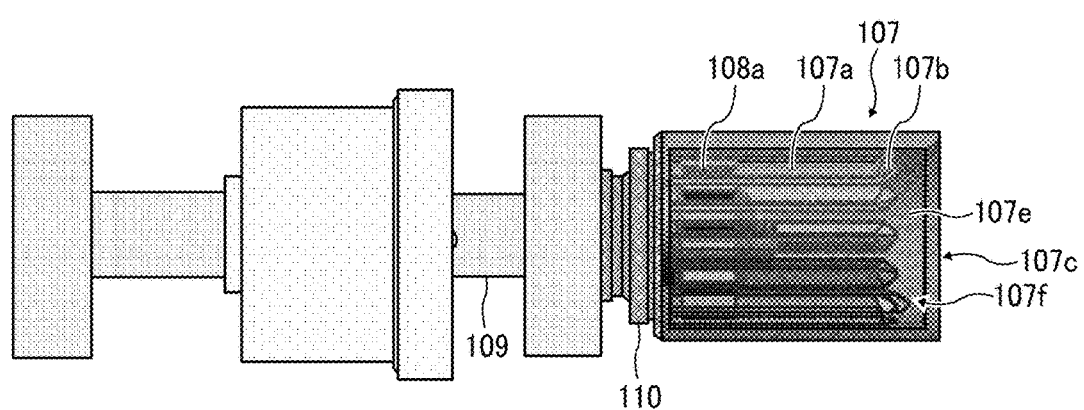
FIG. 8B is a partially transparent cross-sectional view of the connecting portion of Embodiment 3.

FIG. 7 is a cross-sectional view schematically illustrating the connecting portion according to Embodiment 3. FIG. 8A is a partially transparent perspective view schematically illustrating the connecting portion of Embodiment 3. FIG. 8B is a partially transparent cross-sectional view of the connecting portion of Embodiment 3. As illustrated in FIGS. 7, 8A and 8B, one of internal teeth 107a of the intermediate gear 107, that is, an internal tooth 107f serving as a guide member is formed such that the internal tooth 107f projects towards the first opening 107c. In other words, the internal tooth 107f, which is one of the internal teeth 107a, projects beyond other internal teeth 107a in the axial direction. Therefore, as illustrated in FIG. 9A, after the tapered portion 106b of the drive-source side joint gear 106 comes into contact with the end portion of the first opening 107c of the intermediate gear 107 at a collision portion 131, the drive-source side joint gear 106 is directed into the intermediate gear 107.

As illustrated in FIG. 9B, the tapered portion 107b of the internal tooth 107f of the intermediate gear 107 comes into contact with the tapered portion 106b of the external teeth 106a of the drive-source side joint gear 106 at a collision portion 132 before the tapered portion 107b of other internal teeth 107a comes into contact with the external teeth 106a of the drive-source side joint gear 106. The tip T of the ridge line 107r of the tapered portion 107b of the internal tooth 107f of the intermediate gear 107 contacts the slanted surface 106s of the tapered portion 106b of the drive-source side joint gear 106, thereby applying a rotational force in one direction on the intermediate gear 107. As a result, the tapered portion 107b of the internal teeth 107a of the intermediate gear 107 moves to the root of the tooth spaces of the teeth of the drive-source side joint gear 106. The input external gear of the driven side rotary body meshes with the internal teeth 107a of the intermediate gear 107. Accordingly, the intermediate gear 107 and the drive-source side joint gear 106 engage reliably.

In the present illustrative embodiment, the teeth of the intermediate gear 107 are internal teeth. Alternatively, in some embodiments, the teeth of the intermediate gear 107 may be external teeth, and the teeth of the drive-source side joint gear 106 and the teeth of the driven side joint gear 108 may be internal teeth to mesh with the external teeth of the intermediate gear 107.

Furthermore, the internal tooth 107f as the guide member is disposed to satisfy the following relation: $X > D \cdot \tan \theta$, where X is a length in the axial direction between the end of the internal tooth 107f of the intermediate gear 107 and the first opening 107c at the drive source side in the cylindrical portion 107e, D is the internal diameter of the intermediate gear 107, and $\theta$ is the amount of inclination of the intermediate gear 107 in the horizontal direction. With this configuration, when the intermediate gear 107 becomes substantially horizontal, only the internal tooth 107f of the intermediate gear 107 and the external teeth 106a of the drive-source side joint gear 106 reliably mesh with each other. Accordingly, the intermediate gear 107 and the drive-source side joint gear 106 can engage reliably.

Embodiment 4

With reference to FIGS. 10 through 13, a description is provided of another example of the connecting portion of the power transmission device according to Embodiment 4 of the present disclosure.

Figure 10:
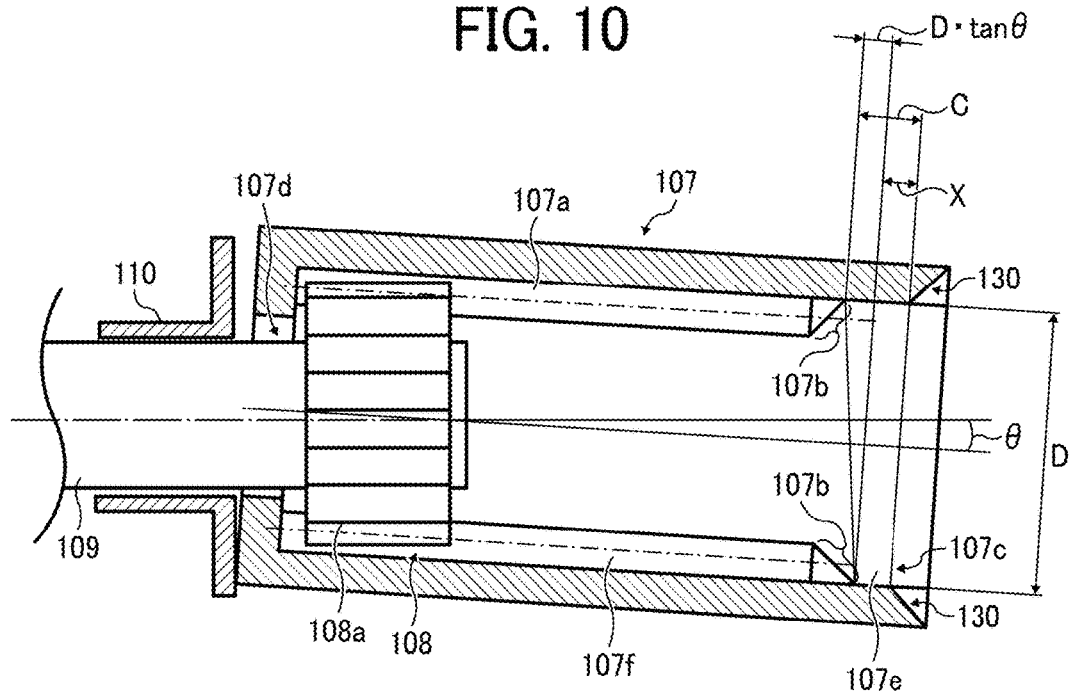
FIG. 10 is a cross-sectional view schematically illustrating the connecting portion under the following condition: $C-X \approx D \cdot \tan \theta$.
Figure 11:
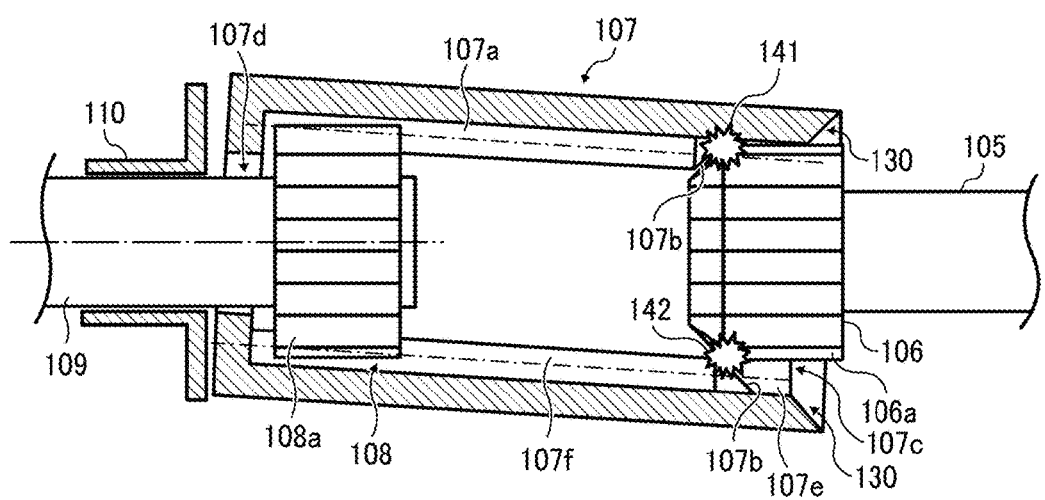
FIG. 11 is a cross-sectional view schematically illustrating the internal teeth of the intermediate gear and the external teeth of the drive-source side joint gear colliding with each other.
Figure 12:
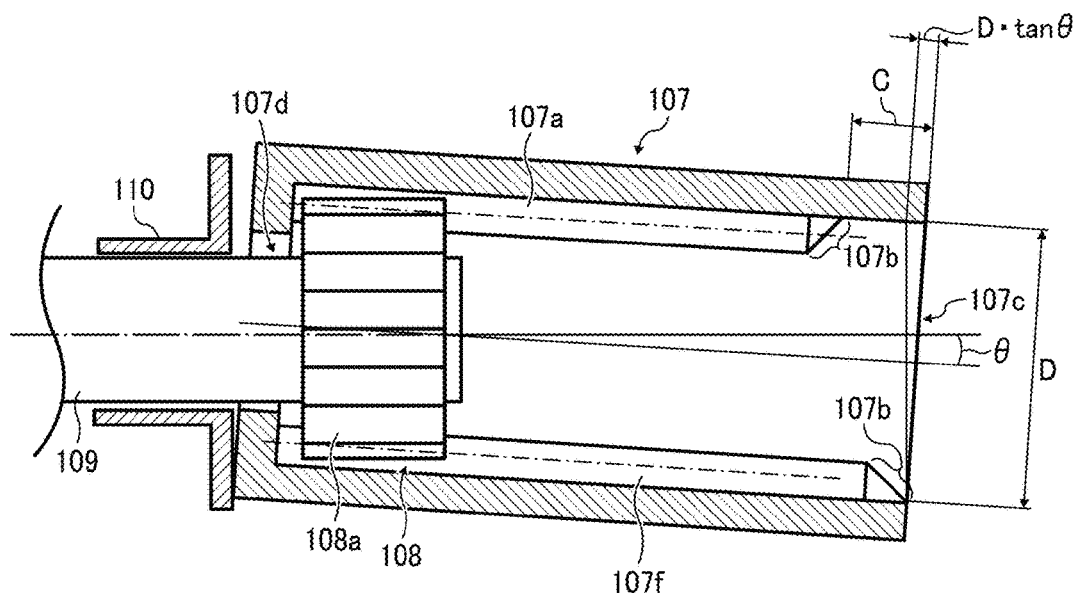
FIG. 12 is a cross-sectional view schematically illustrating the connecting portion according to Embodiment 4.
Figure 13:
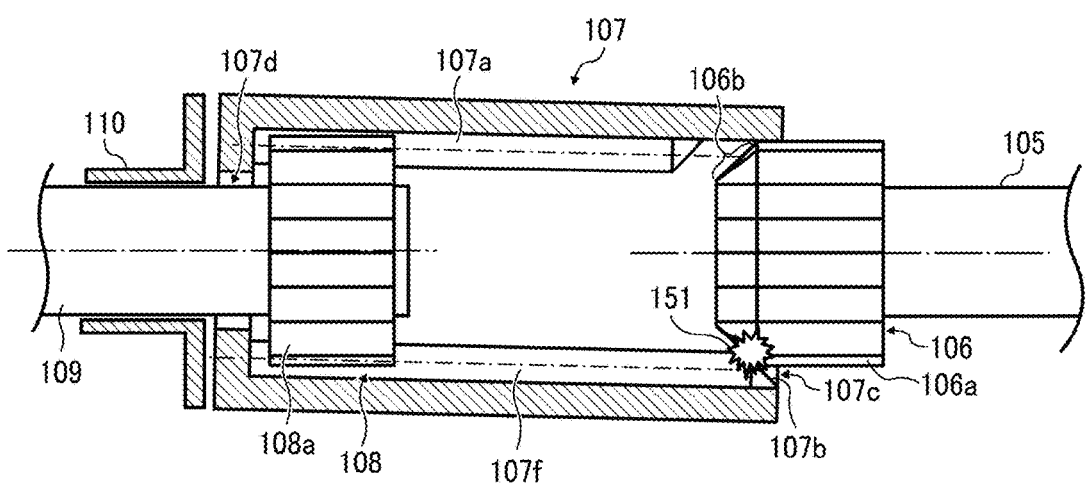
FIG. 13 is a cross-sectional view schematically illustrating the internal teeth of the intermediate gear and the external teeth of the drive-source side joint gear colliding with each other in Embodiment 4.

FIG. 10 is a cross-sectional view schematically illustrating the connecting portion under the following condition: $C - X \approx D \cdot \tan \theta$. FIG. 11 is a cross-sectional view schematically illustrating the internal teeth of the intermediate gear 107 and the external teeth of the drive-source side joint gear 106 colliding with each other. FIG. 12 is a cross-sectional view schematically illustrating the connecting portion according to Embodiment 4. FIG. 13 is a cross-sectional view schematically illustrating the internal teeth of the intermediate gear 107 and the external teeth of the drive-source side joint gear 106 colliding with each other in Embodiment 4.

As illustrated in FIG. 10, assuming that the internal tooth 107f is disposed to satisfy the following relation $C - X \approx D \cdot \tan \theta$, where $\theta$ is the amount of inclination of the intermediate gear 107 in the horizontal direction, D is the internal diameter of the intermediate gear 107, X is the length in the axial direction between the end of the internal teeth 107a of the intermediate gear 107 in the cylindrical portion 107e and the first opening 107c as well as the length in the axial direction between the end of the internal teeth 107f of the intermediate gear 107 in the cylindrical portion 107e and the first opening 107c, even when $C > X$, the internal teeth of the intermediate gear 107 and the external teeth of the drive-source side joint gear collide with each other at two places or more simultaneously when engaging the intermediate gear 107 and the drive-source side joint gear 106.

When the internal tooth 107f as the guide member comes to the lowest position in FIG. 11, it is highly possible that two or more collisions occur. As a result, the internal tooth 107f does not function as the guide member. More specifically, as illustrated in FIG. 11, the slanted surface of the tapered portion 106b of the drive-source side joint gear 106 contacts the tip T of the ridge line 107r of the tapered portion 107b of the internal tooth 107f of the intermediate gear 107 at a collision portion 141. As a result, a lifting force and a rotary force in one direction act on the end surface of the intermediate gear 107 in the axial direction of the teeth at the collision portion 141. Substantially at the same time, a lifting force and a rotary force in the opposite direction act on an end surface of the internal teeth 107a of the intermediate gear 107 in the axial direction at a collision portion 142. As a result, rotary forces in the opposite direction from each other act on the intermediate gear 107, and hence the intermediate gear 107 cannot rotate. The tapered portion 107b of the intermediate gear 107 cannot advance to the root between the teeth of the drive-source side joint gear 106 so that the internal teeth 107a of the intermediate gear 107 and the external teeth 106a of the drive-source side joint gear 106 cannot mesh with each other.

When the internal tooth 107f of the intermediate gear 107 is disposed to satisfy $C - X \approx D \cdot \tan \theta$ or $C - X \leq D \cdot \tan \theta$, the intermediate gear 107 and the drive-source side joint gear 106 do not engage properly.

In view of the above, according to Embodiment 4, the internal tooth 107f of the intermediate gear 107 as the guide member at the connecting portion is disposed to satisfy $C - X > D \cdot \tan \theta$. More specifically, as illustrated in FIG. 12, the length X between the end portion of the internal tooth 107f of the intermediate gear 107 at the cylindrical portion 107e and the first opening 107c in the axial direction is zero (0). With this configuration, as illustrated in FIG. 13, the internal tooth 107a of the intermediate gear 107 contacts the external tooth 106a of the drive-source side joint gear 106 always at one place.

This configuration prevents the internal teeth 107a of the intermediate gear 107 and the external teeth 106a from contacting at two places or more substantially at the same time upon engaging the intermediate gear 107 and the drive-source side joint gear 106. Accordingly, the intermediate gear 107 and the drive-source side joint gear 106 engage properly.

The internal tooth 107f of the intermediate gear 107 as the guide member is disposed to satisfy the following relation: C−X>D−tan θ, where θ' is an amount of inclination of the intermediate gear 107 in the horizontal direction when the internal tooth 107f of the intermediate gear 107 contacts the external tooth 106a of the drive-source side joint gear 106 at a collision portion 151. This configuration facilitates the internal teeth of the intermediate gear 107 and the external teeth of the drive-source side joint gear 106 to contact at one place more easily when engaging the intermediate gear 107 and the drive-source side joint gear 106. Accordingly, the intermediate gear 107 and the drive-source side joint gear 106 engage properly.

Embodiment 5

Figure 14A:
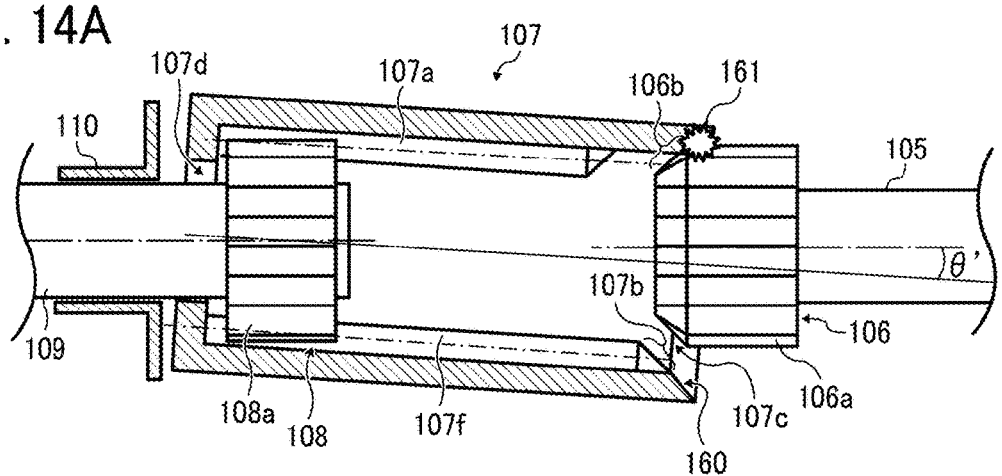
FIGS. 14A through 14C are cross-sectional views schematically illustrating the internal teeth of the intermediate gear and the external teeth of the drive-source side joint gear colliding with each other in Embodiment 5.
Figure 14B:
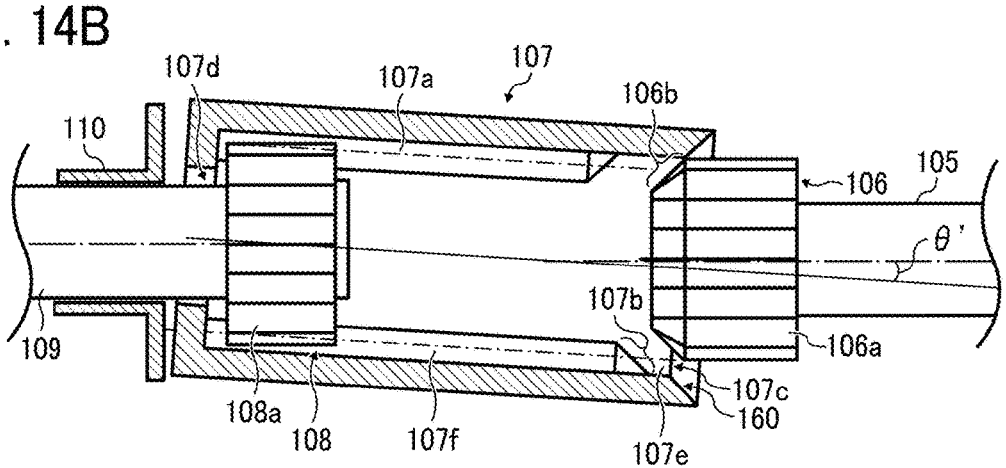
Figure 14C:
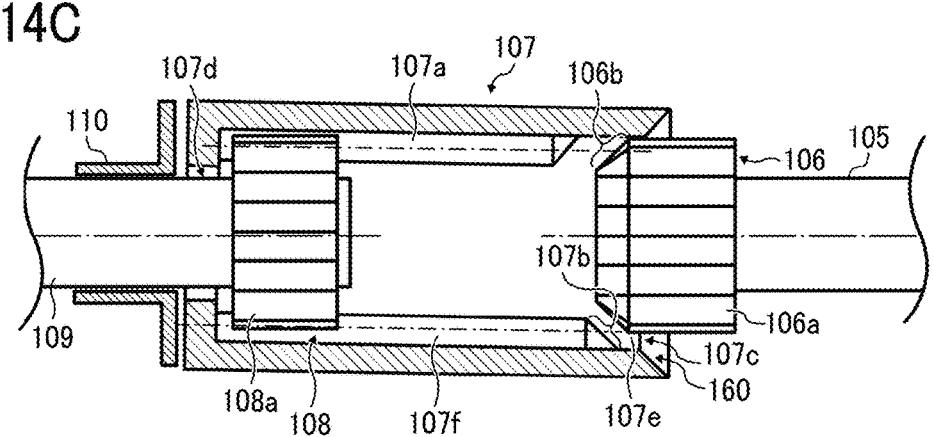

With reference to FIGS. 14A through 14C, a description is provided of another example of the connecting portion of the power transmission device according to Embodiment 5 of the present disclosure.

FIG. 14A is a cross-sectional view schematically illustrating the internal teeth of the intermediate gear 107 and the external teeth of the drive-source side joint gear 106 colliding with each other in Embodiment 5.

The connecting portion of Embodiment 5 illustrated in FIG. 14A includes a tapered portion 160 at the end of the first opening 107c of the intermediate gear 107 at the drive source side. The tapered portion 160 is tapered from the end of outer circumference of the intermediate gear 107 to the end of inner circumference on which the internal teeth are formed. The tapered portion 160 guides smoothly the drive-source side joint gear 106 into the intermediate gear 107. Even when the intermediate gear 107 is tilted, the external teeth of the drive-source side joint gear 106 are prevented from running onto the internal teeth of the intermediate gear 107. The internal teeth of the intermediate gear 107 and the external teeth of the drive-source side joint gear 106 engage properly.

As illustrated in FIGS. 14B and 14C, similar to Embodiment 1, preferably, the cylindrical portion 107e is disposed in Embodiment 5. The external teeth of the drive-source side joint gear 106 advances to the cylindrical portion 107e of the first opening 107c at the drive source side of the intermediate gear 107. When the internal teeth 107a of the intermediate gear 107 contact the external teeth 106a of the drive-source side joint gear 106, the teeth can mesh with each other with the intermediate gear 107 being substantially horizontal in accordance with the orientation of the drive-source side joint gear 106.

Figure 17:
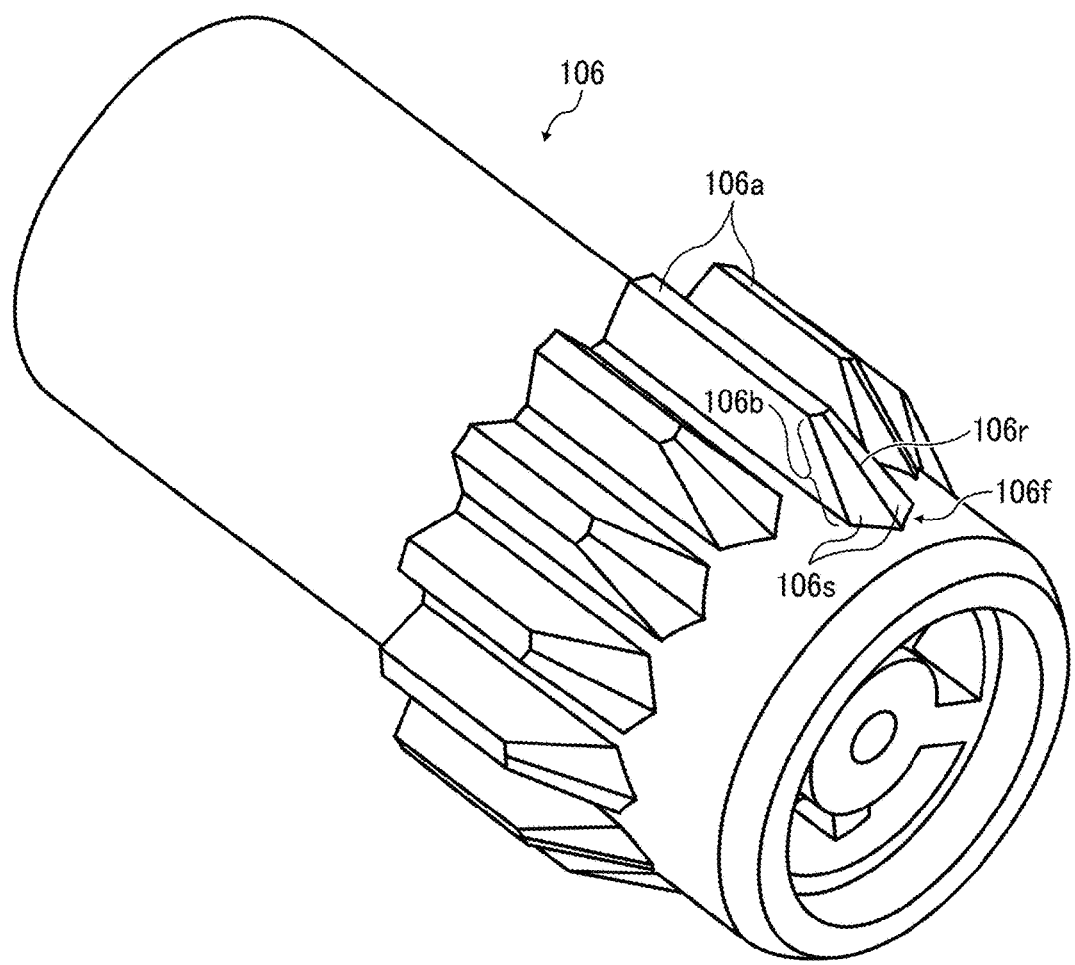
FIG. 17 is a perspective view schematically illustrating a variation of the drive-source side joint gear.

According to the present illustrative embodiment, one of the internal teeth of the intermediate gear 107 is formed to project beyond other teeth. Alternatively, in some embodiments, one of external teeth of the drive-source side joint gear 106, that is, an external tooth 106f shown in FIG. 17 or one of external teeth of the driven side joint gear 108 is formed to project beyond other teeth. Such a configuration also achieves the same or the similar effect as that of the foregoing embodiments.

Still alternatively, in some embodiments, even when the end surface of the internal tooth 107f of the intermediate gear 107, other end surfaces of the internal teeth 107a, and the end surface of the external teeth 106a of the drive-source side joint gear 106 are not tapered, the intermediate gear 107 rotates so as to reduce shaft misalignment and axis declination of the intermediate gear 107 relative to the drive-source side joint gear 106 or the driven side joint gear 108 at the collision portion 132 illustrated in FIG. 9. This rotation continues until all the external teeth 106a of the drive-source side joint gear 106 or all the external teeth 108a of the driven side joint gear 108 mesh with all the internal teeth 107a of the intermediate gear 107. Accordingly, the intermediate gear 107 can reliably mesh with the drive-source side joint gear 106 or with the driven side joint gear 108.

When the drive-source side joint gear 106 and the driven side joint gear 108 are formed of external teeth and the intermediate gear 107 is formed of the internal teeth, the number of teeth is increased effectively. The greater is the number of teeth, the less stress is applied to a contact portion at which the teeth come into contact with each other. Therefore, the gear capable of increasing effectively the number of teeth is advantageous. As described above, the intermediate gear 107 has a cylindrical shape and the teeth thereof are internal teeth while the drive-source side joint gear 106 and the driven side joint gear 108 have external teeth. Alternatively, in some embodiments, the drive-source side joint gear and the driven side joint gear have a cylindrical shape and include internal teeth while the intermediate gear has external teeth.

Figure 15:
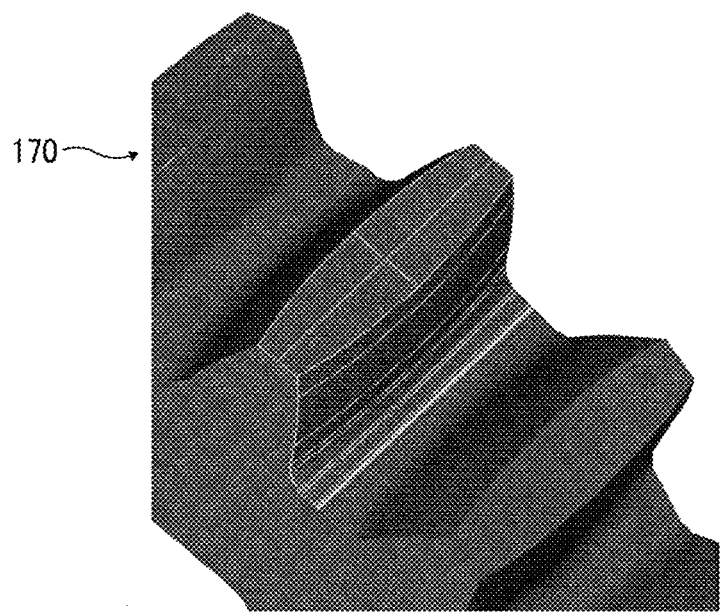
FIG. 15 is a perspective view schematically illustrating crowned gear teeth.

Furthermore, as illustrated in FIG. 15, the drive-source side joint gear, the intermediate gear, and the driven side joint gear are formed through molding process known as crowning process. That is, the drive-source side joint gear, the intermediate gear, and the driven side joint gear have crowned teeth in cross-section in the axial direction. According to the present illustrative embodiment, crowning refers to crowning in a direction of tooth thickness.

More specifically, still referring to FIG. 15, the tooth thickness of an external gear 170 at the center of the face width thereof is at its maximum and the tooth thickness at both ends in the direction of the face width is at its minimum. For example, the external teeth 106a of the drive-source side joint gear 106 and the external teeth 108a of the driven side joint gear 108 are crowned teeth, and the thickness of the crowned teeth in the pitch circle direction changes in the axial direction. The external teeth 106a of the drive-source side joint gear 106 and the external teeth 108a of the driven side joint gear 108 mesh with the internal teeth 107a of the intermediate gear 107 on a predetermined effective tooth face (i.e., at the center of the face width). With this configuration, axis eccentricity and axis declination are tolerated without producing rotation transmission errors.

Furthermore, tooth contact of the intermediate gear 107 contacting the drive-source side joint gear 106 and the driven side joint gear 108 can tolerate an angle error of the gear teeth relative to the rotary shaft, thereby reducing the axial reaction force generated at contact portions.

Detachment and attachment of the drive-source side rotary body relative to the power-transmission rotary body is described. As will be described later in detail, the same effect can be achieved when the driven side rotary body is detached from and attached to the power-transmission rotary body.

Embodiment 6

With reference to FIG. 18, a description is provided of a configuration in which the driven side rotary body is attached to and detached from the power-transmission rotary body according to Embodiment 6. It is to be noted that parts that are the same as those shown in the previously described figures are given the same reference numbers.

FIG. 18 illustrates the power transmission device 100 according to Embodiment 6. The motor 101, which is a drive source, is fixed to the main end plate 201. The gear 103 is disposed coaxially on the drive shaft 102 of the motor 101. The gear 103 constitutes a rotary body having external teeth 103a formed on the outer circumferential surface thereof. The deceleration gear 104 is a two-stage gear including the external teeth 104a at the first stage and the pulley 104b at the second stage.

More specifically, the external teeth 104a mesh with the external teeth 103a of the gear 103. The second stage of the deceleration gear 104 is the pulley 104b. A timing belt 112 is entrained around the pulley 104b and a pulley 105b of the rotary shaft 105. The rotary shaft 105 is rotatably held by the main end plate 201 and the sub-end plate 202. The rotary shaft 105 includes the pulley 105b. The drive-source side joint gear 106 of the drive-source side rotary body is disposed at the end of the rotary shaft 105. The drive-source side joint gear 106 includes the output external gear having external teeth 106a extending in the direction parallel to the axial direction. The intermediate gear 107 has a cylindrical shape and includes a connecting gear with internal teeth 107a formed on an inner circumferential surface thereof. The internal teeth 107a extend in a direction parallel to the axial direction. The end surface of the internal teeth 107a in the axial direction includes the tapered portion 107b.

The intermediate gear 107 includes the first opening 107c at the drive source side in the axial direction and the second opening 107d at the driven side which is opposite the first opening 107c. The intermediate gear 107 is floatingly supported by the rotary shaft 105 with clearance. With this configuration, the intermediate gear 107 is movable within a range allowing transmission of driving force. The intermediate gear 107 includes the cylindrical portion 107e having no internal teeth 107a. The cylindrical portion 107e is formed in a certain area from the second opening 107d. The driven side joint gear 108 is disposed at the process cartridge which is detachably mountable relative to the main body of the image forming apparatus.

More specifically, the driven side joint gear 108 meshes with the intermediate gear 107 disposed at the main body side upon installation and detachment of the process cartridge relative to the main body of the image forming apparatus. The driven side joint gear 108 is disposed at the end portion of the driven side rotary shaft 109 at the driven side and includes the external teeth 108a extending in a direction parallel to the axial direction. An end surface of the external teeth 108a in the axial direction includes a tapered portion 108b.

Although the embodiment of the present disclosure has been described above, the present disclosure is not limited to the foregoing embodiments, but a variety of modifications can naturally be made within the scope of the present disclosure.

[Aspect A]

A power transmission device includes a first rotary body such as the drive-source side joint gear 106 including a first gear rotated by a driving force from a drive source such as the motor 101, the first rotary body being disposed on a drive source side on a power transmission path through which the driving force is transmitted from the drive source to a driven member; a second rotary body such as the driven side joint gear 108 including a second gear disposed on a driven side on the power transmission path; a third rotary body such as the intermediate gear 107 including a third gear disposed on the power transmission path to transmit the driving force to a mating gear by meshing with the mating gear, the third rotary body being movably held within a power transmittable range; and a guide member to contact an end surface of a gear tooth of the third rotary body or an end surface of a gear tooth of the mating gear to guide the gear tooth of the third rotary body between gear teeth of the mating gear or to guide the gear tooth of the mating gear between gear teeth of the third rotary body, the guide member extending toward the mating gear in an axial direction of the one of the first gear, the second gear, and the third gear, and a tip of the guide member being spaced apart a predetermined distance from an end of the one of the first gear, the second gear, and the third gear.

With this configuration, upon engagement, the internal teeth 107a of the intermediate gear 107, the end surface of the external teeth 106a of the drive-source side joint gear 106 or the end surface of the external teeth 108a of the driven side joint gear 108 can contact obliquely the guide member at a certain angle in the axial direction as well as a plane perpendicular to the axial direction. The intermediate gear 107 rotates so as to reduce shaft misalignment and axis declination relative to the drive-source side joint gear 106 or the driven side joint gear 108. This rotation continues until all the external teeth 106a of the drive-source side joint gear 106 or all the external teeth 108a of the driven side joint gear 108 mesh with all the internal teeth 107a of the intermediate gear 107.

Alternatively, in some embodiments, the drive-source side joint gear 106 or the driven side joint gear 108 rotates so as to reduce shaft misalignment and axis declination of the drive-source side joint gear 106 or the driven side joint gear 108 relative to the intermediate gear 107. This rotation continues until all the internal teeth 107a of the intermediate gear 107 mesh with all the external teeth 106a of the drive-source side joint gear 106 or all the external teeth 108a of the driven side joint gear 108. The intermediate gear 107 can be moved to a horizontal position while rotating in one direction, thereby allowing the intermediate gear 107 to mesh continuously with the drive-source side joint gear 106 or with the driven side joint gear 108. With this configuration, the intermediate gear 107 can reliably mesh with the drive-source side joint gear 106 or with the driven side joint gear 108.

[Aspect B]

According to Aspect A, one end of one of the plurality of internal teeth 107a constituting the intermediate gear 107, that is, the internal tooth 107f in the axial direction, projects towards the end surface of the external teeth 106a of the drive-source side joint gear 106 as the mating gear or the end surface of the external teeth 108a of the driven side joint gear 108 as the mating gear. Alternatively, one end of one of the external teeth 106a of the drive-source side joint gear 106 or one end of one of the external teeth 108a of the driven side joint gear 108 in the axial direction projects towards the end surface of the intermediate gear 107. With this configuration, as described above, one end of the internal tooth 107f as the guide member in the axial direction contacts the end surface of the external tooth 106a of the drive-source side joint gear 106 or the end surface of the external tooth 108a of the driven side joint gear 108 in the axial direction. The intermediate gear 107 rotates so as to reduce shaft misalignment and axis declination relative to the drive-source side joint gear 106 or the driven side joint gear 108. This rotation continues until all the external teeth 106a of the drive-source side joint gear 106 or all the external teeth 108a of the driven side joint gear 108 mesh with all the internal teeth 107a of the intermediate gear 107.

Alternatively, one end of one of external teeth 106a of the drive-source side joint gear 106 in the axial direction or one end of one of external teeth 108a of the driven side joint gear 108 in the axial direction contacts the end surface of the internal tooth 107a of the intermediate gear 107. The drive-source side joint gear 106 or the driven side joint gear 108 rotates so as to reduce shaft misalignment and axis declination of the drive-source side joint gear 106 or the driven side joint gear 108 relative to the intermediate gear 107. This rotation continues until all the internal teeth 107*a* of the intermediate gear 107 mesh with all the external teeth 106*a* of the drive-source side joint gear 106 or all the external teeth 108*a* of the driven side joint gear 108. With this configuration, the intermediate gear 107 can reliably mesh with the drive-source side joint gear 106 or with the driven side joint gear 108.

[Aspect C]

According to any one of Aspect A or Aspect B, the intermediate gear 107 has a cylindrical shape, and the guide member satisfies the following relation: $X > D \cdot \tan \theta$, where X is a length in the axial direction between the guide member and the end portion of the opening of the intermediate gear 107, D is the internal diameter of the intermediate gear 107, and $\theta$ is the amount of inclination of the intermediate gear 107 relative to the horizontal direction. With this configuration, as described in Embodiment 2, the intermediate gear 107 rotates so as to reduce shaft misalignment and axis declination of the intermediate gear 107 relative to the drive-source side joint gear 106 or the driven side joint gear 108. This rotation continues until all the external teeth 106*a* of the drive-source side joint gear 106 or all the external teeth 108*a* of the driven side joint gear 108 mesh with all the internal teeth 107*a* of the intermediate gear 107. Accordingly, the intermediate gear 107 can reliably mesh with the drive-source side joint gear 106 or with the driven side joint gear 108.

[Aspect D]

According to Aspect A or Aspect B, the drive-source side joint gear 106 and the driven side joint gear 108 have a cylindrical shape, and the guide member satisfies the following relation: $X > D \cdot \tan \theta$, where X is the length in the axial direction between the guide member and the end portion of the opening of the drive-source side joint gear 106 as well as the length in the axial direction between the guide member and the end portion of the opening of the driven side joint gear 108, D is the internal diameter of the drive-source side joint gear 106 and the driven side joint gear 108, and $\theta$ is the amount of inclination of the drive-source side joint gear 106 and the driven side joint gear 108 relative to the horizontal direction.

As described in Embodiment 2, the length in the axial direction between the guide member and the end portion of the opening of the drive-source side joint gear 106, and the length in the axial direction between the guide member and the end portion of the opening of the driven side joint gear 108 are configured to satisfy the above-described relation. With this configuration, the drive-source side joint gear 106 or the driven side joint gear 108 rotates so as to reduce shaft misalignment and axis declination of the drive-source side joint gear 106 or the driven side joint gear 108 relative to the intermediate gear 107. This rotation continues until all the internal teeth 107*a* of the intermediate gear 107 mesh with all the external teeth 106*a* of the drive-source side joint gear 106 or the external teeth 108*a* of the driven side joint gear 108. Accordingly, the drive-source side joint gear 106 or the driven side joint gear 108 can reliably mesh with the intermediate gear 107.

[Aspect E]

According to any one of Aspects A through D, one end of the intermediate gear 107, the drive-source side joint gear 106, or the driven side joint gear 108 opposite the mating teeth includes a cylindrical portion without teeth in a predetermined range. With this configuration, as described in Embodiment 1, upon engagement, the intermediate gear 107 rotates so as to reduce shaft misalignment and axis declination of the intermediate gear 107 relative to the drive-source side joint gear 106 or the driven side joint gear 108. In the cylindrical portion 107*e*, the end surface of the external teeth 106*a* of the drive-source side joint gear 106 in the axial direction or the end surface of the external teeth 108*a* of the driven side joint gear 108 does not contact the end surface of the internal teeth 107*a* of the intermediate gear 107 in the axial direction, thereby allowing the intermediate gear 107 to rotate. With this configuration, the end surface of the external teeth 106*a* of the drive-source side joint gear 106 in the axial direction or the end surface of the external teeth 108*a* of the driven side joint gear 108 is guided to the root between the teeth of the intermediate gear 107.

Alternatively, in some embodiments, the drive-source side joint gear 106 or the driven side joint gear 108 rotates so as to reduce shaft misalignment and axis declination of the drive-source side joint gear 106 or the driven side joint gear 108 relative to the intermediate gear 107 upon engagement. In the cylindrical portion 107*e*, the end surface of the external teeth 106*a* of the drive-source side joint gear 106 in the axial direction or the end surface of the external teeth 108*a* of the driven side joint gear 108 does not contact the end surface of the internal teeth 107*a* of the intermediate gear 107 in the axial direction, thereby enabling the drive-source side joint gear 106 or the driven side joint gear 108 to rotate. With this configuration, the end surface of the internal teeth 107*a* of the intermediate gear 107 is guided to the root between the external teeth 106*a* of the drive-source side joint gear 106 or between the external teeth 108*a* of the driven side joint gear 108. Accordingly, the intermediate gear 107 can reliably mesh with the drive-source side joint gear 106 or with the driven side joint gear 108.

[Aspect F]

According to Aspect D, the cylindrical portion is disposed to satisfy the following relation: $C > D \cdot \tan \theta$, where C is a length of the cylindrical portion in the axial direction, D is an internal diameter of the intermediate gear 107, the drive-source side joint gear 106, or the driven side joint gear 108, and $\theta$ is an amount of inclination of the intermediate gear 107, the drive-source side joint gear 106, or the driven side joint gear 108 relative to the horizontal direction. With this configuration, as described in Embodiment 3, in the cylindrical portion 107*e*, the intermediate gear 107, the drive-source side joint gear 106, or the driven side joint gear 108 can rotate. With this configuration, the end surface of the external teeth 106*a* of the drive-source side joint gear 106 in the axial direction or the end surface of the external teeth 108*a* of the driven side joint gear 108 is guided to the root between the teeth of the intermediate gear 107.

Alternatively, the end surface of the internal teeth 107*a* of the intermediate gear 107 is guided to the root between the external teeth 106*a* of the drive-source side joint gear 106 or between the external teeth 108*a* of the driven side joint gear 108. Accordingly, the intermediate gear 107 can reliably mesh with the drive-source side joint gear 106 or with the driven side joint gear 108.

[Aspect G]

According to Aspect D, the guide member satisfies the following relation: $C - X > D \cdot \tan \theta$, where $\theta$ is the amount of inclination of the intermediate gear 107, the drive-source side joint gear 106 or the driven side joint gear 108 relative to the horizontal direction, D is the internal diameter of the drive-source side joint gear 106 or the driven side joint gear 108, C is the length of the cylindrical portion in the axial direction, and X is the length in the axial direction between the guide member and the end portion of the opening of the drive-source side joint gear 106 as well as the length in the axial direction between the guide member and the end portion of the opening of the driven side joint gear 108.

As described in Embodiment 4, the length in the axial direction between the guide member and the end portion of the opening of the drive-source side joint gear 106, and the length in the axial direction between the guide member and the end portion of the opening of the driven side joint gear 108 are configured to satisfy the above-described relation. This configuration prevents the internal teeth of the intermediate gear 107 and the external teeth 106a from contacting simultaneously at two places or more upon engaging the intermediate gear 107 and the drive-source side joint gear 106 or the driven side joint gear 108. Accordingly, the intermediate gear 107 can reliably mesh with the drive-source side joint gear 106 or with the driven side joint gear 108. Accordingly, the intermediate gear can reliably mesh with the drive-source side joint gear or with the driven side joint gear.

[Aspect H]

According to Aspect D, the guide member satisfies the following relation: C−X>D·tan θ, where θ' is the amount of inclination of the intermediate gear 107 relative to the horizontal direction when the drive-source side joint gear 106 or the driven side joint gear 108 is mounted in the cylindrical portion 107e of the intermediate gear 107, D is the internal diameter of the intermediate gear 107, the drive-source side joint gear 106, or the driven side joint gear 108, C is the length of the cylindrical portion in the axial direction, and X is the length in the axial direction between the guide member and the end portion of the opening of the power-transmission rotary body.

As described in Embodiment 5, the length in the axial direction between the guide member and the end portion of the opening of the drive-source side joint gear 106, and the length in the axial direction between the guide member and the end portion of the opening of the driven side joint gear 108 are configured to satisfy the above-described relation. With this configuration, when the drive-source side joint gear 106 or the driven side joint gear 108 is fitted to the cylindrical portion 107e of the intermediate gear 107, the internal tooth of the intermediate gear 107 and the external tooth of the drive-source side joint gear 106 or the external tooth of the driven side joint gear 108 contact easily at one place. Accordingly, the intermediate gear can reliably mesh with the drive-source side joint gear or with the driven side joint gear.

[Aspect I]

According to any one of Aspects A through H, the end surface of the intermediate gear 107 in the axial direction includes the tapered portion 130 tapered from the end of outer circumference of the intermediate gear 107 toward the gear teeth. With this configuration, as described above, the drive-source side joint gear 106 or the driven side joint gear 108 is guided smoothly into the intermediate gear 107. Even when the drive-source side joint gear 106 or the driven side joint gear 108 is fitted to the intermediate gear 107 in a state in which the intermediate gear 107 is tilted, the external teeth of the drive-source side joint gear 106 or the driven side joint gear 108 are prevented from meshing improperly such as getting onto the internal teeth of the intermediate gear 107. Accordingly, the intermediate gear 107 can reliably mesh with the drive-source side joint gear 106 or with the driven side joint gear 108.

[Aspect J]

According to any one of Aspects A through I, a tooth flank of the output gear, a tooth flank of the input gear, a tooth flank of the connecting gear are crowned in the axial direction. With this configuration, as described above, the axial reaction force is reduced, if not prevented entirely. Accordingly, the intermediate gear 107 can reliably mesh with the drive-source side joint gear 106 or with the driven side joint gear 108.

[Aspect K]

An image forming apparatus includes a plurality of rotary bodies such as the photoconductor 40K and the developing device 61K, and the power transmission device according to any one of Aspects A through J to transmit a driving force from a drive source such as the drive motor to the plurality of rotary bodies. With this configuration, as described above, improper meshing is prevented, and hence operability of the image forming apparatus is enhanced.

[Aspect L]

According to Aspect K, the power transmission device is employed to transmit the driving force to the developing unit. With this configuration, as described above, the effect of changes in the space between the shaft of the photoconductor and the shaft of the developing roller is reduced, if not prevented entirely, thereby preventing image defects such as image unevenness.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A power transmission device, comprising:
a first rotary body including a first gear rotated by a driving force from a drive source, the first rotary body being on a drive source side on a power transmission path through which the driving force is transmitted from the drive source to a driven member;
a second rotary body including a second gear on a driven side on the power transmission path; and
a third rotary body including a third gear on the power transmission path to transmit the driving force to the second rotary body by meshing with the first gear and the second gear, the third gear including internal gear teeth having a length in an axial direction that is shorter than an end of the third rotary body on the drive source side,
wherein the third rotary body is movably held within a power transmittable range, and wherein one of the gear teeth of the third rotary body projects beyond the rest of the gear teeth of the third rotary body in the axial direction.

2. The power transmission device according to claim 1, wherein an end surface of the third rotary body in the axial direction includes a tapered portion which is tapered from an outer circumference of the third rotary body toward the gear teeth of the third gear.

3. The power transmission device according to claim 1, wherein a tooth flank of the third gear and a tooth flank of a mating gear are crowned in the axial direction.

4. The power transmission device according to claim 1,
wherein a guide member is the one of the gear teeth of the third rotary body that projects beyond the rest of the gear teeth of the third rotary body in the axial direction.

5. The power transmission device according to claim 4, wherein the third rotary body has a cylindrical shape with an opening, and the guide member satisfies the following relation:

$$X > D \cdot \tan \theta,$$

where $\theta$ is an amount of inclination of the third rotary body relative to a horizontal direction, D is an internal diameter of the third rotary body, and X is a distance between an end of the opening and the guide member.

6. The power transmission device according to claim 1,
wherein a guide member is the one of the gear teeth of the third rotary body; and
wherein one end of the third rotary body, which has a cylindrical shape with an opening, facing a mating gear in the axial direction includes a cylindrical toothless portion at which no gear teeth are formed in a predetermined range in an axial direction thereof.

7. The power transmission device according to claim 6, wherein the cylindrical toothless portion satisfies the following relation:

$$C > D \cdot \tan \theta,$$

where $\theta$ is an amount of inclination of the third rotary body relative to a horizontal direction, D is an internal diameter of the third rotary body, and C is a length of the cylindrical toothless portion in the axial direction.

8. The power transmission device according to claim 6 wherein the guide member satisfies the following relation:

$$C - X > D \cdot \tan \theta,$$

where $\theta$ is an amount of inclination of the third rotary body relative to a horizontal direction, D is an internal diameter of the third rotary body, C is a length of the cylindrical toothless portion in the axial direction, and X is a distance between the guide member and an end of the opening of the third rotary body.

9. The power transmission device according to claim 6, wherein the guide member satisfies the following relation:

$$C - X > D \cdot \tan \theta',$$

where $\theta'$ is an amount of inclination of the third rotary body relative to a horizontal direction as one of the first rotary body and the second rotary body is mounted in the cylindrical toothless portion, D is an internal diameter of the third rotary body, C is a length of the cylindrical toothless portion in the axial direction, and X is a distance between the guide member and an end of the opening of the third rotary body.

10. An image forming apparatus, comprising:
a plurality of rotary bodies; and
the power transmission device of claim 1 to transmit the driving force from the drive source to the plurality of rotary bodies.

11. The image forming apparatus, according to claim 10, wherein the plurality of rotary bodies includes a developing device, and the power transmission device transmits the driving force to the developing device.

12. The power transmission device according to claim 1, wherein the third rotary body includes a first opening at the drive source side in the axial direction and a second opening at the driven side which is opposite the first opening.

13. The power transmission device according to claim 12, wherein the third rotary body is floatingly supported at the second opening by a driven side rotary shaft with a clearance.

14. The power transmission device according to claim 1, wherein the second rotary body includes external teeth substantially at an end of a driven side rotary shaft in the axial direction.

15. The power transmission device according to claim 14, wherein the driven side rotary shaft is rotatably held by a retainer.

16. The power transmission device according to claim 15, wherein a gap is formed between an inner circumferential surface of the retainer and a circumferential surface of the driven side rotary shaft facing the inner circumferential surface of the retainer.

17. The power transmission device according to claim 1, wherein the third rotary body is detachably attachable to the first rotary body and the second rotary body.

* * * * *